US010958318B2

(12) United States Patent
Hong et al.

(10) Patent No.: US 10,958,318 B2
(45) Date of Patent: Mar. 23, 2021

(54) APPARATUS AND METHOD FOR UPLINK TRANSMISSION IN WIRELESS COMMUNICATION SYSTEM

(71) Applicants: Samsung Electronics Co., Ltd., Suwon-si (KR); Seoul National University R&DB Foundation, Seoul (KR)

(72) Inventors: Sungnam Hong, Suwon-si (KR); Chanhong Kim, Suwon-si (KR); Sunho Park, Seoul (KR); Byonghyo Shim, Seoul (KR); Yeohun Yun, Hwaseong-si (KR); Seunghwan Lee, Seoul (KR); Guyoung Lim, Seoul (KR); Jongbu Lim, Seoul (KR); Hyoungju Ji, Seoul (KR); Taeyoung Kim, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 16/054,769

(22) Filed: Aug. 3, 2018

(65) Prior Publication Data

US 2019/0044588 A1 Feb. 7, 2019

(30) Foreign Application Priority Data

Aug. 4, 2017 (KR) ........................ 10-2017-0099067

(51) Int. Cl.
*H04B 7/0456* (2017.01)
*H04L 5/00* (2006.01)
(Continued)

(52) U.S. Cl.
CPC ......... *H04B 7/0456* (2013.01); *H04B 7/0617* (2013.01); *H04L 1/1861* (2013.01); *H04L 5/0048* (2013.01); *H04L 5/0053* (2013.01)

(58) Field of Classification Search
CPC .. H04B 7/0413; H04B 7/0617; H04B 7/0456; H04B 7/0639; H04B 7/0417
(Continued)

(56) References Cited

U.S. PATENT DOCUMENTS 6,952,671 B1 * 10/2005 Kolesnik ................. G10L 19/07 704/222
2005/0249298 A1 * 11/2005 Kim ........................ H04L 5/026 375/260
(Continued)

FOREIGN PATENT DOCUMENTS

KR 10-2016-0106664 A 9/2016
WO 2015149668 A1 10/2015

OTHER PUBLICATIONS

Kwon, Suhyuk (Seokbeop), et al., "Multipath Matching Pursuit," arXiv:1308.4791v6 [cs.IT], Mar. 10, 2014, 17 pages.

*Primary Examiner* — Shuwang Liu
*Assistant Examiner* — Gina M McKie

(57) ABSTRACT

The present disclosure relates to a 5G or pre-5G communication system for supporting a higher data transmission rate than in a 4G communication system such as LTE. The present disclosure relates to uplink transmission in a wireless communication system, and an operating method of a terminal includes mapping codes that are included in at least one codebook onto data symbols. and transmitting the data symbols spread by using the at least one codebook, and the data symbols are used for a base station to detect at least one active terminal including the terminal.

17 Claims, 26 Drawing Sheets

(51) Int. Cl.
*H04B 7/06* (2006.01)
*H04L 1/18* (2006.01)

(58) Field of Classification Search
USPC .......................................................... 375/267
See application file for complete search history.

(56) References Cited

U.S. PATENT DOCUMENTS

2010/0046657 A1* 2/2010 Karlsson ................. H04L 27/28
375/267
2010/0150266 A1* 6/2010 Mondal ................ H04B 7/0639
375/296
2017/0295500 A1* 10/2017 Sun ...................... H04B 7/0456
2017/0302500 A1* 10/2017 Lu ........................... H04L 29/08
2018/0375707 A1* 12/2018 Bala .................... H04L 27/2627
2020/0295905 A1* 9/2020 Takeda .................. H04W 72/04

* cited by examiner $x_1 \sim x_N = 721 \sim 724$ $c_1 = 726$ $c_3 = 727$ $c_{10} = 728$ $c_{16} = 729$ $$y = \theta \begin{bmatrix} 0 \\ m_2 \\ 0 \\ \vdots \\ m_{36} \\ \vdots \\ m_{84} \\ \vdots \\ 0 \end{bmatrix} \qquad m_2 = \begin{bmatrix} 0 \\ \vdots \\ m_{15}^{(2)} \\ \vdots \\ m_{27}^{(2)} \\ \vdots \\ 0 \end{bmatrix}$$

2010

2020

K-sparse in group (K = 3)

L-sparse (L = 2)

FIG.20

APPARATUS AND METHOD FOR UPLINK TRANSMISSION IN WIRELESS COMMUNICATION SYSTEM

CROSS-REFERENCE TO RELATED APPLICATION AND CLAIM OF PRIORITY

This application is based on and claims priority under 35 U.S.C. § 119 to Korean Patent Application No. 10-2017-0099067, filed on Aug. 4, 2017, in the Korean Intellectual Property Office, the disclosure of which is incorporated by reference herein in its entirety.

BACKGROUND

1. Field

The present disclosure relates to a wireless communication system, and more particularly, to apparatus and methods for uplink transmission in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the 5G system, various transmission methods are being discussed. For example, a grant-free transmission method that transmits data without a grant during uplink transmission has been suggested. Furthermore, various discussions for supporting the grant-free transmission more efficiently are ongoing.

The above information is presented as background information only to assist with an understanding of the present disclosure. No determination has been made, and no assertion is made, as to whether any of the above might be applicable as prior art with regard to the present disclosure.

SUMMARY

Based on the above-described discussion, the present disclosure provides an apparatus and a method for effectively transmitting uplink data in a wireless communication system.

In addition, the present disclosure provides an apparatus and a method for transmitting uplink data on a grant-free basis in a wireless communication system.

In addition, the present disclosure provides an apparatus and a method for transmitting uplink data in a non-orthogonal multiple access (NOMA) method in a wireless communication system.

In addition, the present disclosure provides an apparatus and a method for transmitting a reference signal by using a codebook determined based on a codebook for a data symbol in a wireless communication system.

In addition, the present disclosure provides an apparatus and a method for transmitting a data symbol by using a code which varies according to a data symbol in a wireless communication system.

In addition, the present disclosure provides an apparatus and a method for performing active user detection (AUD) using a data symbol, and channel estimation (CE) using a reference signal, independently, in a wireless communication system.

In addition, the present disclosure provides an apparatus and a method for performing active user detection and channel estimation jointly by using a reference signal in a wireless communication system.

According to various embodiments of the present disclosure, an operating method of a terminal in a wireless communication system includes: mapping codes included in at least one codebook onto data symbols; and transmitting the data symbols spread by using the at least one codebook, wherein the data symbols are used for a base station to detect at least one active terminal including the terminal.

According to various embodiments of the present disclosure, an operating method of a base station in a wireless communication system includes: receiving at least one data symbol; detecting active terminals based on the at least one data symbol; and estimating channels of the active terminals by using the at least one data symbol.

According to various embodiments of the present disclosure, an operating method of a base station in a wireless communication system includes:

receiving data symbols and reference signals from a plurality of terminals; based on the received reference signals, determining information regarding reception signals indicating components included in respective channel impulse responses of the plurality of terminals; and performing active user detection and channel estimation by using the information regarding the reception signals.

According to various embodiments of the present disclosure, a terminal apparatus in a wireless communication system includes: at least one processor configured to map codes included in at least one codebook onto data symbols; and a transceiver configured to transmit the data symbols spread by using the at least one codebook, wherein the data symbols are used for a base station to detect at least one active terminal including the terminal.

According to various embodiments of the present disclosure, a base station apparatus in a wireless communication system includes: a transceiver configured to receive at least one data symbol; and at least one processor configured to detect active terminals based on the at least one data symbol, and to estimate channels of the active terminals by using the at least one data symbol.

According to various embodiments of the present disclosure, a base station apparatus in a wireless communication system includes: a transceiver configured to receive data symbols and reference signals from a plurality of terminals; and at least one processor configured to, based on the received reference signals, determine information regarding reception signals indicating components included in respective channel impulse responses of the plurality of terminals, and to perform active user detection and channel estimation by using the information regarding the reception signals.

The apparatus and the method according to various embodiments of the present disclosure determine different NOMA codebooks for respective data symbols, and thus can further enhance performance of active user detection (AUD).

In addition, the apparatus and the method according to various embodiments of the present disclosure perform active user detection using data symbols and channel estimation (CE) using reference signals, simultaneously, and thus can flexibly design arrangements and structures of reference signals.

In addition, the apparatus and the method according to various embodiments of the present disclosure perform active user detection and channel estimation jointly based on reference signals, and thus can enhance performance of active user detection and channel estimation.

The effects that can be achieved by the present disclosure are not limited to those mentioned in the above, and other effects that are not mentioned herein could be clearly understood by a person skilled in the art based on the following descriptions.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 20 is a view illustrating an example of a sparse vector configuration in a wireless communication system according to various embodiments of the present disclosure;

DETAILED DESCRIPTION

Figure 1:
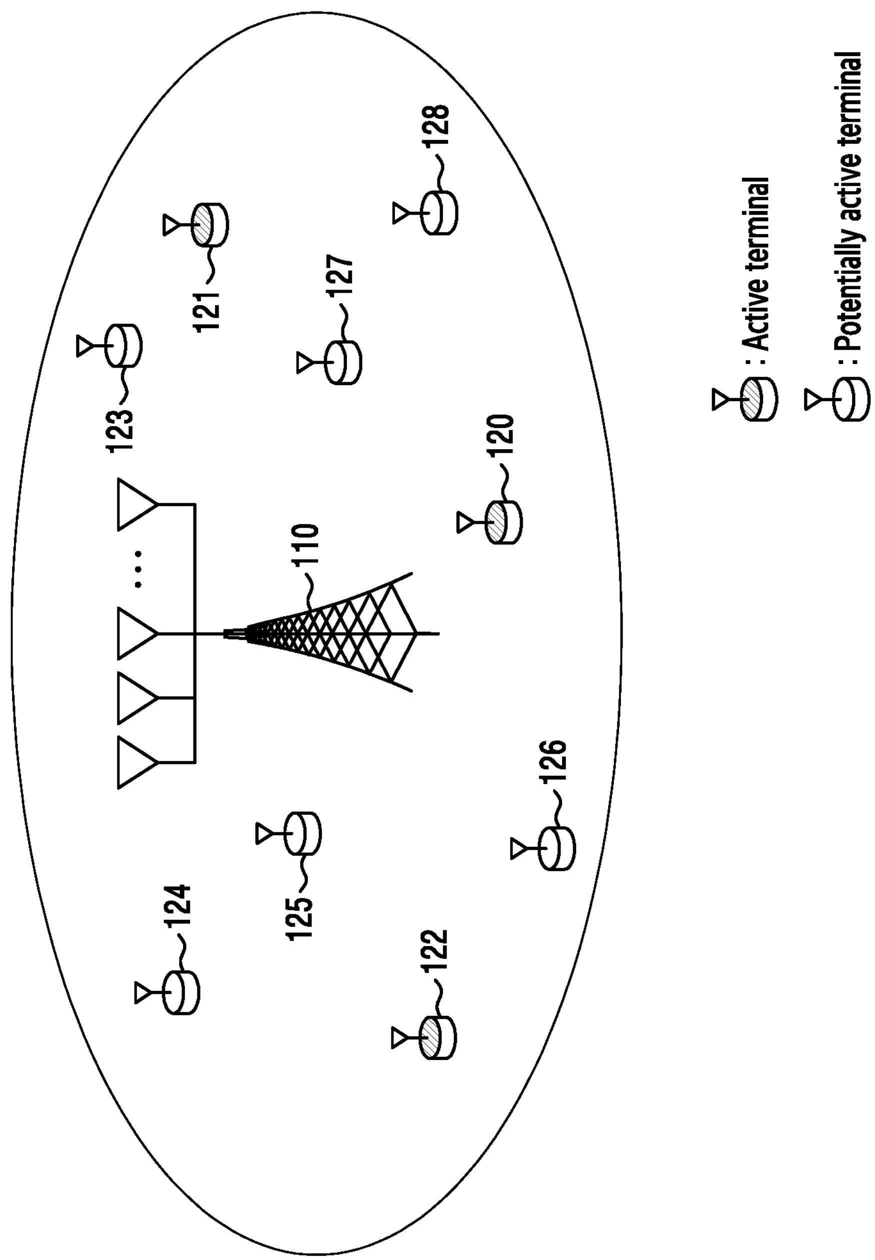
FIG. 1 is a view illustrating a wireless communication system according to various embodiments of the present disclosure.

FIGS. 1 through 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Terms used in the present disclosure are used to describe specified embodiments and are not intended to limit the scope of other embodiments. The terms of a singular form may include plural forms unless otherwise specified. All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way, unless expressly so defined herein in the present disclosure. In some cases, even if terms are terms which are defined in the specification, they should not be interpreted as excluding embodiments of the present disclosure.

In various embodiments of the present disclosure described below, hardware-wise approach methods will be described by way of an example. However, various embodiments of the present disclosure include technology using both hardware and software, and thus do not exclude software-based approach methods.

The present disclosure relates to an apparatus and a method for uplink competition-based communication in a wireless communication system. Specifically, the present disclosure describes technology for performing active user detection using a data symbol and channel estimation using a reference signal, independently, in order to more efficiently perform active user detection (AUD) and channel estimation (CE) in a wireless communication system. In addition, the present disclosure describes technology for performing active user detection and channel estimation jointly based on a reference signal, in order to more efficiently perform active user detection and channel estimation in a wireless communication system.

As used herein, terms indicating signals, terms indicating channels, terms indicating control information, means used to process signals (for example, a codebook, a sequence, etc.), terms indicating network entities, terms indicating states of devices (for example, active, potential, etc.), terms indicating elements of the apparatus are examples for convenience of explanation. Accordingly, the present disclosure is not limited to the terms described below, and other terms having the same technical meanings may be used.

In addition, the present disclosure will describe various embodiments by using terms used in some communication standards (for example, 3rd Generation Partnership Project (3GPP)), but this is merely an example for convenience of explanation. Various embodiments of the present disclosure may be easily modified and applied to other communication systems.

FIG. 1 is a view illustrating a wireless communication system according to various embodiments of the present disclosure. In FIG. 1, a base station 110 and a plurality of terminals 120 to 128 are illustrated as a portion of nodes using radio channels in the wireless communication system. Although FIG. 1 illustrates only one base station, other base stations which are the same or similar as or to the base station 110 may further be included. In addition, although FIG. 1 illustrates 9 terminals, fewer or more terminals may exist.

The base station 110 may be a network infrastructure that provides a wireless access to the terminals 120-128. The base station 110 may have a coverage that is defined as a predetermined geographical region based on a distance within which a signal is transmitted and received. The base station 110 may be referred to as an "access point (AP)," an "eNodeB (eNB)," a 5th generation node (5G node)", a "wireless point," a "transmission/reception point (TRP)", or other terms having the same technical meaning as those of the above-mentioned terms, in addition to the base station.

The terminals 120-128 are devices that are used by users and may communicate with the base station 110 via radio channels. According to a circumstance, at least one of the terminals 120-128 may be managed without involvement of a user. That is, the terminals 120-128 may be devices that perform machine type communication (MTC), and may not be carried by users. A portion (120-122) of the terminals 120-128 may be active terminals, and the other terminals (123-128) may be potentially active terminals. Herein, the active terminals refer to terminals that transmit uplink signals within a given time section from among the terminals accessing the base station 110, and the potentially active terminals refer to the other terminals. The active terminal and the potentially active terminal are a concept that changes according to time. Each of the terminals 120-128 may be referred to as a "user equipment (UE)," a "mobile station," a "subscriber station," a "remote terminal," or a "wireless terminal," or a "user device," or other terms having the same technical meaning as those of the above-mentioned terms, in addition to the terminal.

According to an embodiment, the base station 110 and the terminals 120-128 may transmit and receive radio signals in a millimeter-wave (mmWave) band (for example, 28 GHz, 30 GHz, 38 GHz, 60 GHz). In this case, in order to enhance a channel gain, the base station 110 and the terminals 120-128 may perform beamforming. Herein, the beamforming may include transmission beamforming and reception beamforming. That is, the base station 110 and the terminals 120-128 may give a directivity to a transmission signal or a reception signal. To achieve this, the base station 110 and the terminals 120-128 may select serving beams through a beam search procedure. However, various embodiments described below are not limited to operations in the millimeter wave band, and according to another embodiment, the base station 110 and the terminals 120-128 may perform communication in bands other than the millimeter wave band.

In addition, the base station 110 may provide various types of services to the terminals 120-128. For example, an enhanced mobile broadcast (eMBB) service supporting a high data transmission speed, an ultra-reliable low-latency (URLL) service supporting high reliability and low latency, a massive machine-type communication (mMTC) service supporting massive IoT communication, or the like may be provided. A portion of the various services may be provided through the same time-frequency resource, and in this case, the services may have different numerologies. In this case, the base station 110 may support grant-free-based uplink transmission or non-orthogonal multiple access (NOMA)-based uplink transmission with respect to at least one of the above-described services.

Figure 2:
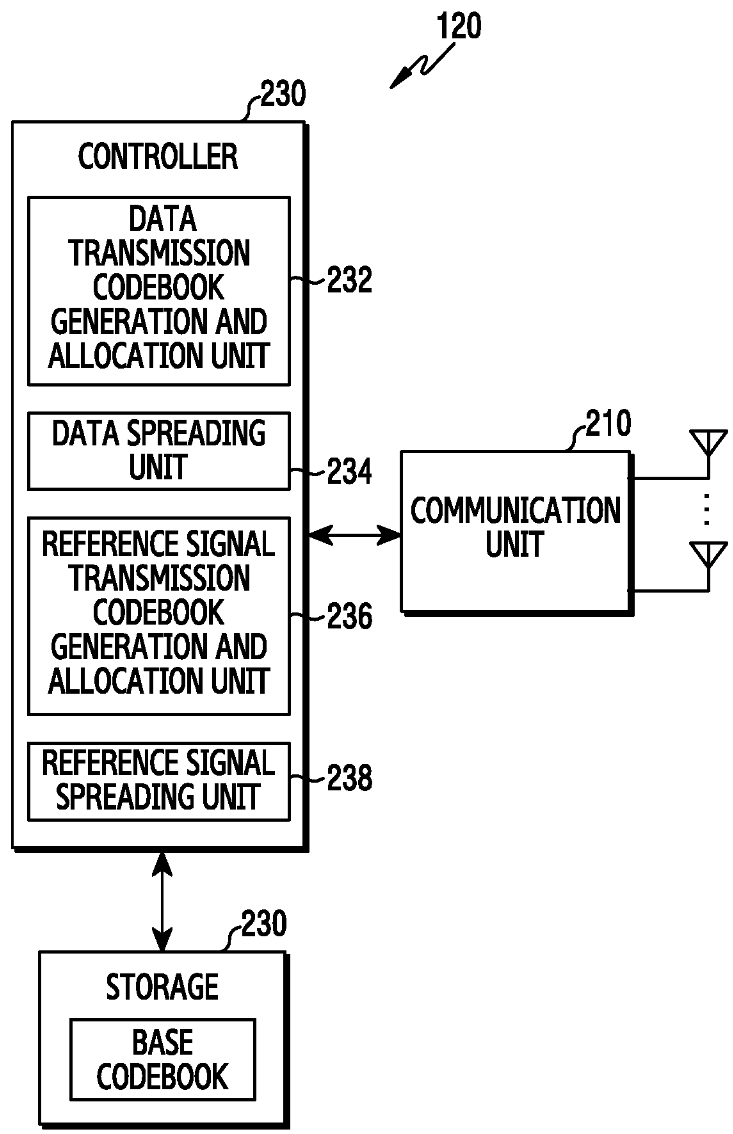
FIG. 2 is a view illustrating a configuration of a terminal in a wireless communication system according to various embodiments of the present disclosure.

FIG. 2 is a view illustrating a configuration of a terminal in a wireless communication system according to various embodiments of the present disclosure. The configuration illustrated in FIG. 2 may be understood as a configuration of any one of the terminals 120-128, and the terminal 120 will be described below as a representative. The term "unit" or terms ending with suffixes "-er," and "-or" used in the following description refer to a unit processing at least one function or operation, and may be implemented by hardware, software, or a combination of hardware and software.

Referring to FIG. 2, the terminal 120 may include a communication unit 210, a storage 220, and a controller 230.

The communication unit 210 performs functions for transmitting and receiving signals via a radio channel. For example, the communication unit 210 may perform a function of converting between a baseband signal and a bit string according to a physical layer standard of the system. For example, when transmitting data, the communication unit 210 may generate complex symbols by encoding and modulating a transmission bit string. In addition, when receiving data, the communication unit 210 may restore a reception bit string by demodulating and decoding a baseband signal. In addition, the communication unit 210 may up-convert a baseband signal into a radio frequency (RF) band signal, and then may transmit the signal via an antenna, and may down-convert an RF band signal received via an antenna into a baseband signal. For example, the communication unit 210 may include a transmission filter, a reception filter, an amplifier, a mixer, an oscillator, a digital-to-analogue converter (DAC), an analogue-to-digital converter (ADC), etc.

In addition, the communication unit 210 may include a plurality of transmission and reception paths. Furthermore, the communication unit 210 may include at least one antenna array including a plurality of antenna elements. In the hardware aspect, the communication unit 210 may include a digital circuit and an analog circuit (for example, a radio frequency integrated circuit (RFIC)). Herein, the digital circuit and the analogue circuit may be implemented by a single package. In addition, the communication unit 210 may include a plurality of RF chains. Furthermore, the communication unit 210 may perform beamforming.

The communication unit 210 may transmit and receive signals as described above. Accordingly, an entirety or a portion of the communication unit 210 may be referred to as a "transmitter," "receiver," or "transceiver." In addition, in the following description, transmitting and receiving via a radio channel may include processing by the communication unit 210 as described above.

The storage 220 may store data such as a basic program for the operation of the terminal 120, an application program, setting information, etc. The storage 220 may include a volatile memory, a nonvolatile memory, or a combination of a volatile memory and a nonvolatile memory. According to various embodiments, the storage 230 may store a base codebook. The base codebook may be at least one codebook related to a data symbol, and may be used to generate another codebook related to a reference signal. In addition, the storage 220 provides stored data according to a request of the controller 230.

The controller 230 controls overall operations of the terminal 120. For example, the controller 230 may transmit and receive signals via the communication unit 210. In addition, the controller 230 may record or read out data on or from the storage 220. In addition, the controller 230 may perform functions of a protocol stack required by the communication standard. To achieve this, the controller 230 may include at least one processor or micro processor, or may be a portion of a processor. In addition, a portion of the communication unit 210 and the controller 230 may be referred to as a communication processor (CP). In particular, according to various embodiments, the controller 230 may control the terminal 120 to perform uplink transmission having at least one attribute of a grant-free and non-orthogonal multiple access. For example, the controller 230 may include a data transmission codebook generation and allocation unit 232, and a data spreading unit 234. The data transmission codebook generation and allocation unit 232 may generate a different codebook for every transmission region of data symbols, or may generate a different codebook by circularly shifting a base codebook. The data transmission codebook generation and allocation unit 232 may allocate the generated codebook to respective data symbols. The data spreading unit 234 may map the data symbols allocated the codebook to resource regions, and may transmit the data to the base station. In addition, the controller 230 may include at least one reference signal transmission codebook generation and allocation unit 236 used to transmit a reference signal. In addition, the controller 230 may include a reference signal spreading unit 238 to spread a reference signal allocated a codebook to a resource region.

According to various embodiments, the controller 230 may control to allocate a different non-orthogonal multiple access codebook to respective data symbols, and to spread the data symbols allocated the codebook to resource regions. For example, the controller 230 may control the terminal 120 to perform operations according to various embodiments described below.

Figure 3:
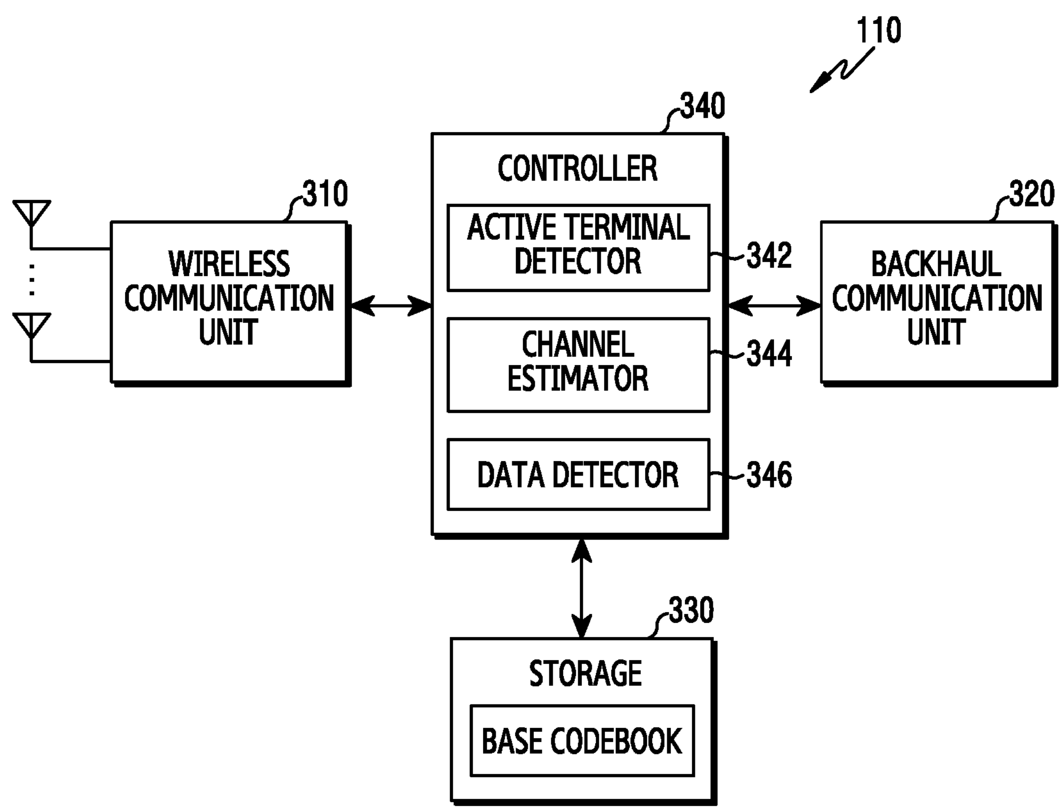
FIG. 3 is a view illustrating a configuration of a base station in a wireless communication system according to various embodiments of the present disclosure.

FIG. 3 is a view illustrating a configuration of a base station in a wireless communication system according to various embodiments of the present disclosure. The configuration illustrated in FIG. 3 may be understood as a configuration of the base station 110. The term "unit" or terms ending with suffixes "-er," and "-or" refer to a unit processing at least one function or operation and may be implemented by hardware, software, or a combination of hardware and software.

Referring to FIG. 3, the base station 110 may include a wireless communication unit 310, a backhaul communication unit 320, a storage 330, and a controller 340.

The wireless communication unit 310 performs functions for transmitting and receiving signals via a radio channel. For example, the wireless communication unit 310 may perform a function of converting between a baseband signal and a bit string according to a physical layer standard of the system. For example, when transmitting data, the wireless communication unit 310 may generate complex symbols by encoding and modulating a transmission bit string. In addition, when receiving data, the wireless communication unit 310 may restore a reception bit string by demodulating and decoding a baseband signal. In addition, the wireless communication unit 310 may up-convert a baseband signal into an RF band signal, and then may transmit the signal via an antenna, and may down-convert an RF band signal received via an antenna into a baseband signal.

To achieve this, the wireless communication unit 310 may include a transmission filter, a reception filter, an amplifier, a mixer, an oscillator, a DAC, an ADC, or the like. In addition, the wireless communication unit 310 may include a plurality of transmission and reception paths. Furthermore, the wireless communication unit 310 may include at least one antenna array including a plurality of antenna elements. In the hardware aspect, the wireless communication unit 310 may include a digital unit and an analog unit, and the analog unit may include a plurality of sub-units according to operating power, an operating frequency, or the like.

The wireless communication unit 310 may transmit and receive signals as described above. Accordingly, an entirety or a portion of the wireless communication unit 310 may be referred to as a "transmitter," "receiver," or "transceiver." In addition, in the following description, transmitting and receiving via a radio channel may include processing by the wireless communication unit 310 as described above.

The backhaul communication unit 320 provides an interface for communicating with the other nodes in the network. That is, the backhaul communication unit 320 may convert a bit string to be transmitted to another node, for example, another access node, another base station, an upper node, a core network, or the like, into a physical signal, and may convert a physical signal transmitted from another node into a bit string.

The storage 330 may store data such as a basic program for the operation of the base station 110, an application program, setting information, or the like. The storage 330 may include a volatile memory, a nonvolatile memory, or a combination of a volatile memory and a nonvolatile memory. In addition, the storage 330 provides stored data according to a request of the controller 340.

The controller 340 controls overall operations of the base station 110. For example, the controller 340 may transmit and receive signals via the wireless communication unit 310 or the backhaul communication unit 320. In addition, the controller 340 may record or read out data on or from the storage 330. In addition, the controller 340 may perform functions of a protocol stack required by the communication standard. To achieve this, the controller 340 may include at least one processor. According to various embodiments, the controller 340 may include an active terminal detector 342, a channel estimator 344, and a data detector 346. The active terminal detector 342 may perform active user detection through a data symbol or reference signal received from a terminal. The channel estimator 344 may perform channel estimation with respect to the detected active terminal. The data detector 346 may detect data of a received signal. Herein, the active terminal detector 342, the channel estimator 344, and the data detector 346 may be a storage space that stores an instruction/code resided in the controller 340 at least temporarily, or an instruction/code, as an instruction set or code stored in the storage 330, or may be a portion of a circuitry constituting the controller 340.

According to various embodiments, the controller 340 may control to perform active user detection by using a data symbol allocated a non-orthogonal multiple access codebook, which varies according to a data symbol. For example, the controller 340 may control the base station 110 to perform operations according to various embodiments, which will be described below.

Figure 4:
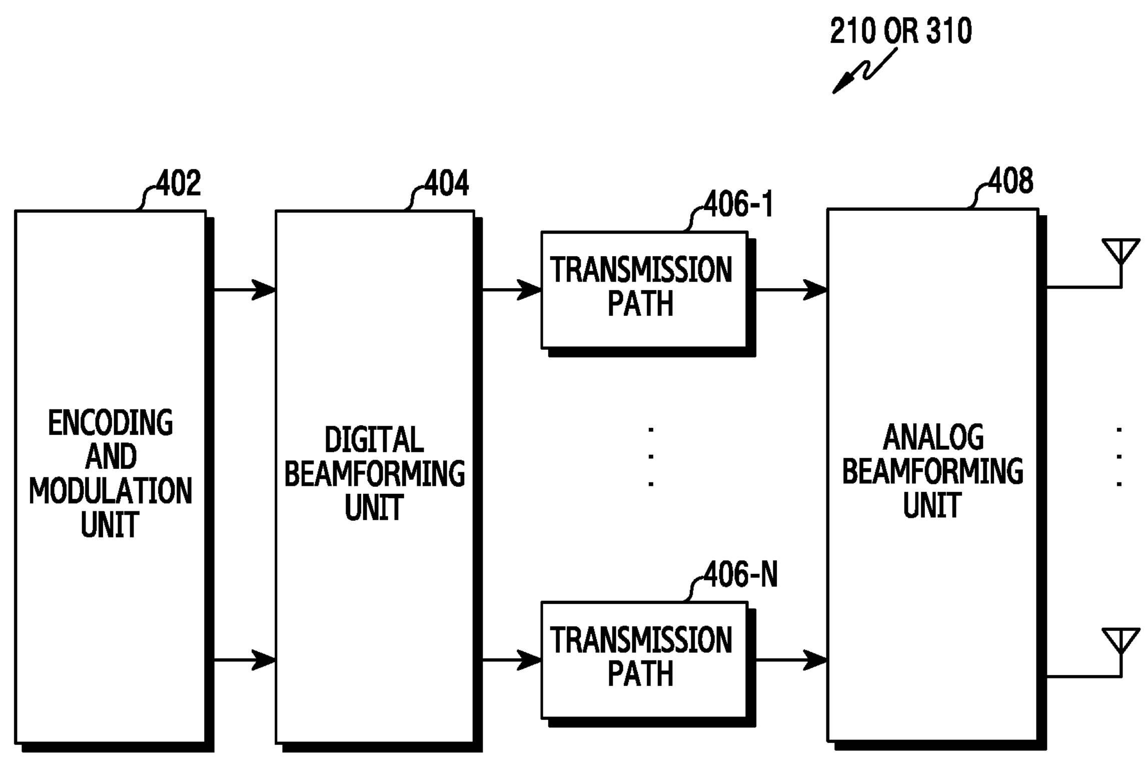
FIG. 4 is a view illustrating a configuration of a communication unit in a wireless communication system according to various embodiments of the present disclosure.

FIG. 4 is a view illustrating a configuration of a communication unit in a wireless communication system according to various embodiments of the present disclosure. FIG. 4 illustrates an example of a detailed configuration of the communication unit 210 of FIG. 2 or the wireless communication unit 310 of FIG. 3. Specifically, FIG. 4 illustrates elements for beamforming, as a portion of the communication unit 210 of FIG. 2 or the wireless communication unit 310 of FIG. 3.

Referring to FIG. 4, the communication unit 210 or the wireless communication unit 310 includes an encoding and modulation unit 402, a digital beamforming unit 404, a plurality of transmission paths 406-1 to 406-N, and an analog beamforming unit 408.

The encoding and modulation unit 402 performs channel encoding. For channel encoding, at least one of a low density parity check (LDPC) code, a convolution code, and a polar code may be used. The encoding and modulation unit 402 may generate modulation symbols by performing constellation mapping.

The digital beamforming unit 404 performs beamforming with respect to a digital signal (for example, modulation symbols). To achieve this, the digital beamforming unit 404 multiplies the modulation symbols with beamforming weights. Herein, the beamforming weights may be used to change a size and a phase of a signal, and may be referred to as a "precoding matrix," "precoder," etc. The digital beamforming unit 404 outputs the digital-beamformed modulation symbols to the plurality of transmission paths 406-1 to 406-N. In this case, according to a multiple input multiple output (MIMO) transmission technique, the modulation symbols may be multiplexed or the same modulation symbols may be provided to the plurality of transmission paths 406-1 to 406-N.

The plurality of transmission paths 406-1 to 406-N may convert the digital-beamformed digital signals into analogue signals. To achieve this, each of the plurality of transmission paths 406-1 to 406-N may include an inverse fast Fourier transform (IFFT) operation unit, a cyclic prefix (CP) insertion unit, a DAC, an up-conversion unit. The CP insertion unit may be for an orthogonal frequency division multiplexing (OFDM) method, and may be excluded when another physical layer method (for example, a filter bank multi-carrier (FBMC)) is applied. That is, the plurality of transmission paths 406-1 to 406-N provides an independent signal processing process with respect to a plurality of streams generated by digital beamforming. However, according to an implementation method, a portion of the elements of the plurality of transmission paths 406-1 to 406-N may be shared.

The analog beamforming unit 408 performs beamforming with respect to an analogue signal. To achieve this, the digital beamforming unit 404 multiplies analog signals with beamforming weights. Herein, the beamforming weights may be used to change a size and a phase of a signal.

It is common that a procedure of requesting resources and obtaining an approval is required to perform uplink transmission. However, when large scale devices perform uplink transmission like massive machine-type communication (mMTC), a probability of collision of preambles between devices increases. In addition, this runs counter to requirement of the mMTC service requiring low power due to an overhead of a control signal. In view of ultra-reliable and low latency communication (uRLLC), a problem of transmission delay may arise. Accordingly, to solve these problems, researches on grant-free type NOMA systems utilizing non-orthogonal multiple access technology are actively conducted in recent years. Furthermore, the researches encompass researches on active user detection (AUD) to specify a terminal that transmits data, as well as channel estimation and data detection, in the grant-free-based systems.

Accordingly, various embodiments of the present disclosure suggest a process of allocating, by a terminal, a codebook to a data symbol or a reference signal to perform uplink transmission, and technology of performing, by a base station, active user detection and channel estimation, and also performing data detection by using a received signal. More specifically, according to an embodiment, the terminal maps codes included in different codebooks onto data symbols to perform uplink communication. The base station determines a first reception signal model regarding the received data symbol, and performs active user detection through a second reception signal model determined by using the first reception signal model. In addition, embodiments suggest a method of the base station to perform channel estimation with respect to a detected active terminal by using a virtual reference signal or doppler estimation. According to a second embodiment, the terminal allocates different codebooks to data symbols and reference signals to perform uplink communication. The base station may determine a third reception signal model regarding a received reference signal, and may perform active user detection and channel estimation, simultaneously, through a fourth reception signal model and a fourth reception signal model which are determined by using the third reception signal model. Through this, the present disclosure aims at enhancing performance of active user detection and performance of channel estimation, and finally aims at enhancing performance of data detection. In particular, in a first embodiment, by enhancing performance of active user detection by increasing the number of data symbols, the present disclosure achieves a delay time and a block error rate (BLER) conforming to an uRLLC scenario. In addition, in the second embodiment, by performing active user detection and channel estimation jointly based on a grouping and decision rule, the base station can enhance performance of active user detection and channel estimation, and can further enhance the performance of active user detection and channel estimation through an enhanced compressive sensing algorithm.

Figure 5:
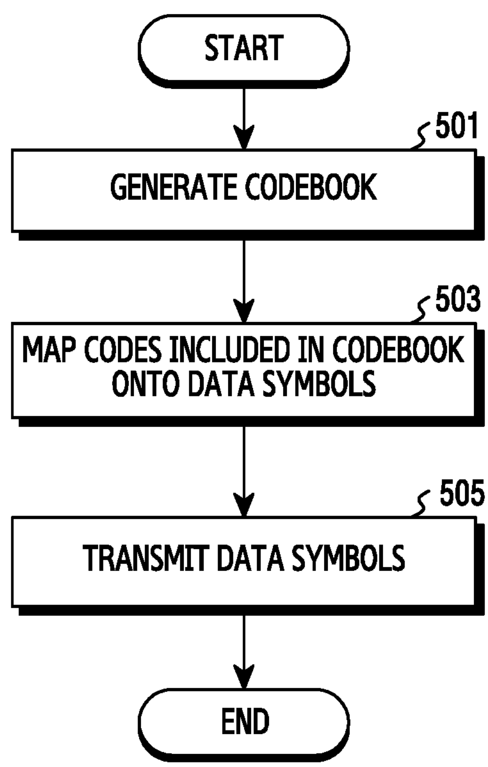
FIG. 5 is a view illustrating a flowchart of a terminal in a wireless communication system according to various embodiments of the present disclosure.

FIG. 5 is a view illustrating a flowchart of a terminal in a wireless communication system according to various embodiments of the present disclosure. FIG. 5 illustrates an example of an operating method of the terminal 120.

Referring to FIG. 5, the terminal generates a codebook in step 501. In this case, the terminal may generate codebooks for allocating codes to data symbols. For example, the terminal may generate independent codebooks for every transmission region of data symbols, or may generate different codebooks by circularly shifting a base codebook. However, the codebook may be pre-generated. In this case, step S501 may be omitted, and the terminal may perform an operation of step 503 with respect to the pre-generated codebook.

In step 503, the terminal may map codes included in the codebook onto data symbols. That is, the terminal may map the codes included in the codebook onto the data symbols to spread the data symbols, and may distinguish the data symbols from one another through the mapped codes. In an embodiment, the terminal may map different codes onto respective data symbols regardless of a resource region. In another embodiment, the terminal may map different codes onto respective data symbols according to a resource region.

In step 505, the terminal may transmit the data symbols. More specifically, the terminal may map the data symbols spread through the codebook onto the resource regions to perform uplink transmission. In addition, the terminal may transmit the data symbols encoded with the codes to a base station (for example, the base station 110). The data symbols transmitted to the base station may be used for active user detection and channel estimation.

Although not shown, the terminal may transmit a reference signal. For example, the terminal may spread a reference signal by using a codebook before transmitting the data symbols, and may transmit the spread reference signal to the base station. Herein, the codebook for spreading the reference signal may be different from the codebook for spreading the data symbols. The transmitted reference signal may be used for channel estimation at the base station.

Figure 6A:
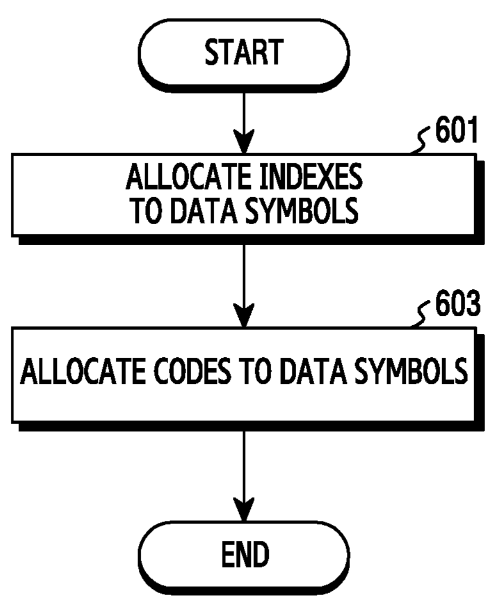
FIG. 6A is a view illustrating a flowchart of a terminal which maps codes included in a codebook onto data symbols in a wireless communication system according to various embodiments of the present disclosure.

FIG. 6A is a view illustrating a flowchart of a terminal which maps codes included in a codebook onto data symbols in a wireless communication system according to various embodiments of the present disclosure. FIG. 6A illustrates a method of determining different codes for respective data symbols regardless of a resource region, as an operating method of the terminal 120.

Referring to FIG. 6A, in step 601, the terminal allocates indexes to respective data symbols. More specifically, the terminal may allocate indexes 1 to M to data symbols to allocate different codes to the data symbols. Herein, M is a natural number larger than or equal to 1.

In step 603, codes are allocated to the data symbols. In an embodiment, the terminal may make the indexes of the data symbols coincide with indexes of the codebook. That is, the terminal may allocate the indexes 1 to M allocated to the data symbols to the codebook. Accordingly, the terminal makes the indexes of the data symbols coincide with the indexes of the codebook, and thus is able to allocate codes included in the codebook to the data symbols. In another embodiment, the terminal may allocate codes to the data symbols by using an interleaver. By allocating different codes to the data symbols, the terminal may determine codes for the respective data symbols for spreading the data symbols. For example, codes for respective data symbols may be determined as in an example of FIG. 7A.

Figure 6B:
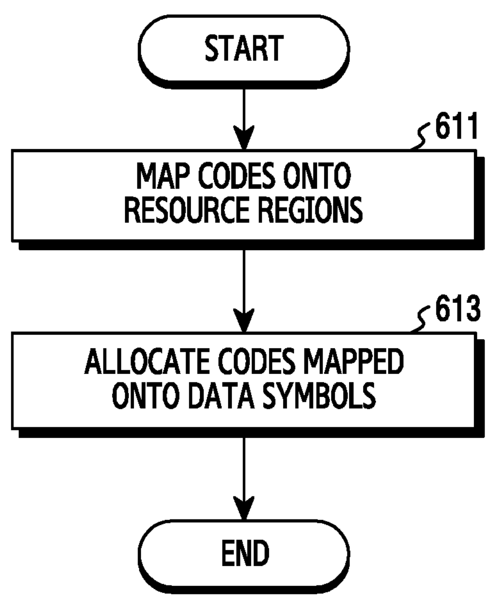
FIG. 6B is a view illustrating a flowchart of a terminal which maps codes included in a codebook onto data symbols in a wireless communication system according to various embodiments of the present disclosure.

FIG. 6B is a view illustrating a flowchart of a terminal which maps codes included in a codebook onto data symbols in a wireless communication system according to various embodiments of the present disclosure. FIG. 6B illustrates a method of determining different codes for respective data symbols according to a resource region, as an operating method of the terminal 120.

Referring to FIG. 6B, in step 611, the terminal may map codes onto resource regions. More specifically, the terminal may allocate indexes of a codebook to given resource regions to which data symbols are transmitted. Next, the terminal may map codes included in the codebook onto the resource regions in sequence, based on the indexes of the codebook allocated to the given resource regions. For example, a mapping relationship between the resource regions and the codes may follow an example of FIG. 7B.

In step 613, the terminal may allocate the mapped codes to data symbols. More specifically, the terminal may allocate the data symbols to the resource regions. Subsequently, the terminal may allocate the codes mapped onto the corresponding resource regions to the data symbols. By allocating the different codes to the respective data symbols, the terminal may determine codes for respective data symbols for spreading the data symbols.

In the embodiment described with reference to FIG. 6B, the codes may be mapped onto the resource regions. However, the mapping relationship between the resource regions and the codes may be pre-defined. In this case, step 611 may be omitted, and the terminal may identify information indicating a pre-defined mapping relationship and then may perform an operation of step 613.

Figure 7A:
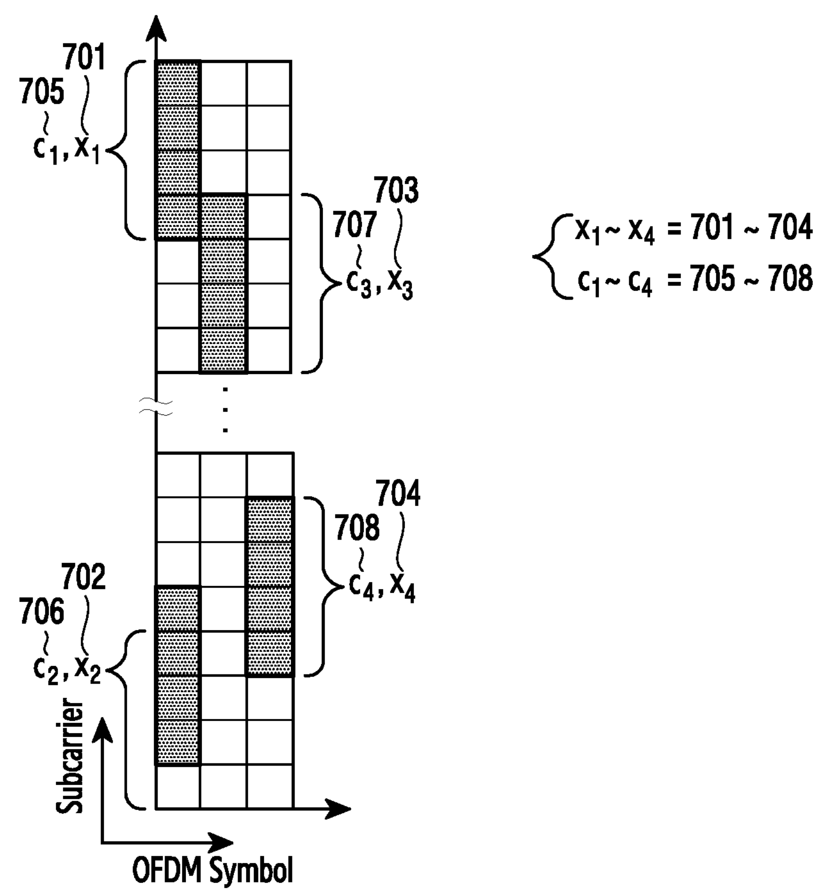
FIG. 7A is a view illustrating an example of determining a code according to each data symbol in a wireless communication system according to various embodiments of the present disclosure.
Figure 7B:
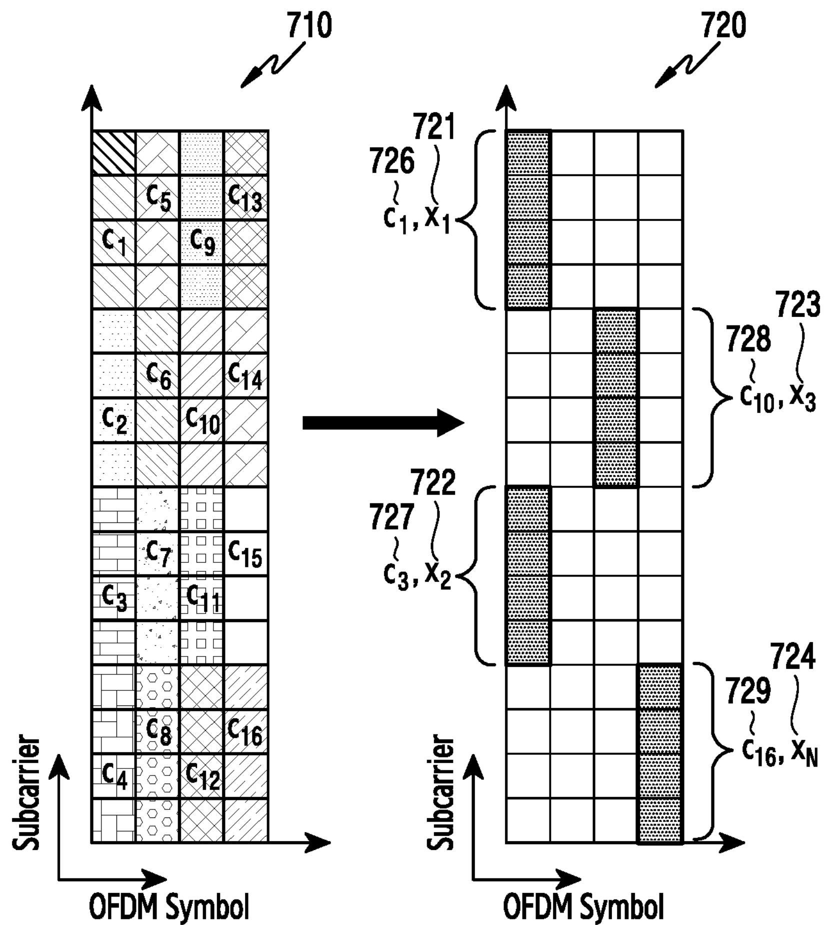
FIG. 7B is a view illustrating an example of determining a code according to each data symbol in a wireless communication system according to various embodiments of the present disclosure.

FIGS. 7A and 7B are views illustrating an example of determining codes for respective data symbols in a wireless communication system according to various embodiments of the present disclosure. In FIGS. 7A and 7B, the horizontal axis indicates an OFDM symbol and the vertical axis indicates a sub carrier.

In FIG. 7A, arrangements of data symbol regions 701 to 704 and codebooks 705 to 708 may vary according to various embodiments. However, terminals activated during the same resource section may share the data symbol regions 701 to 704. Referring to FIG. 7A, the terminal may spread data symbols by using codes included in the determined codebooks. The spread data symbols may be transmitted through the data symbol regions 701 to 704.

FIG. 7B illustrates mapping of codebooks onto resource regions 710, and allocation of codes to data symbols 720. Arrangements of data symbol regions 721 to 724 and codebooks 726 to 729 may vary according to various embodiments. However, terminals activated during the same resource section may share the data symbol regions 721 to 724. Referring to FIG. 7B, codes included in the codebooks may be mapped onto the given resource regions in sequence. For example, the terminal may map codes included in the codebooks c1 to c16 onto the given resource regions. After mapping the codes, the terminal may map the data symbols onto the data symbol regions 721 to 724, and in this case, may spread the corresponding data symbols by using the codes mapped onto the corresponding data symbols.

As described above, the terminal may spread the data symbols by using the plurality of codebooks, and may transmit the spread data symbols. Accordingly, a base station may receive the spread data symbols, may detect active terminals based on the spread data symbols, and may detect data. Hereinafter, a detailed configuration and operations of a base station will be described.

Figure 8:
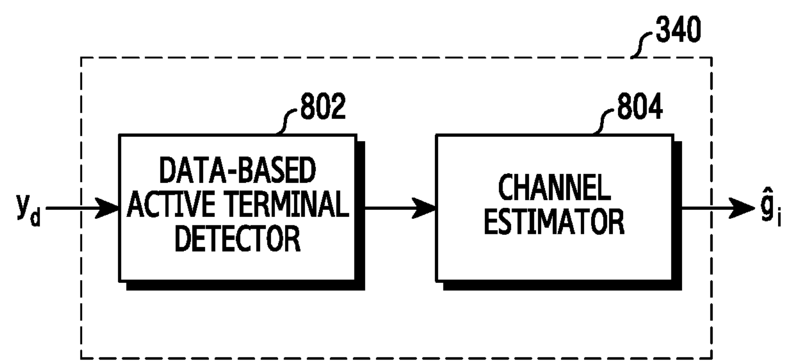
FIG. 8 is a view illustrating a block configuration of a base station in a wireless communication system according to various embodiments of the present disclosure.

FIG. 8 is a view illustrating a functional block configuration of a base station in a wireless communication system according to various embodiments of the present disclosure. FIG. 8 illustrates an example of a functional block configuration of the controller 340 of the base station 110. The term "unit" or terms ending with suffixes "-er," and "-or" used in the following description refer to a unit processing at least one function or operation, and may be implemented by hardware, software, or a combination of hardware and software.

Referring to FIG. 8, the controller 340 may include a data-based active terminal detector 802 and a channel estimator 804. The data-based active terminal detector 802 may detect data symbols of an active terminal (for example, the terminal 120) from a received signal yd by using a codebook for spreading data symbols. Herein, all data symbols received are used as values for active user detection. In addition, the data-based active terminal detector 802 may transmit, to the channel estimator 804, information regarding the detected active terminal, for example, an index of the active terminal, and a value in the form of multiplication of a data symbol and a channel of the active terminal.

The channel estimator 804 may detect a channel $\hat{g}_1$ of the active terminal independently by using the information regarding the detected active terminal. Herein, channel estimation by using a virtual reference signal and channel estimation by using doppler estimation may be performed.

Figure 9:
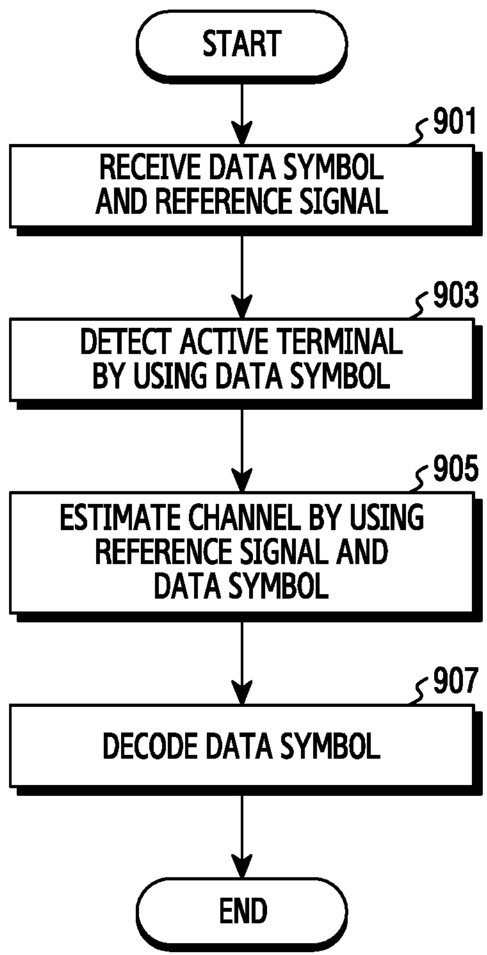
FIG. 9 is a view illustrating a flowchart of a base station in a wireless communication system according to various embodiments of the present disclosure.

FIG. 9 is a view illustrating a flowchart of a base station in a wireless communication system according to various embodiments of the present disclosure. FIG. 9 illustrates an example of an operating method of the base station 110.

Referring to FIG. 9, in step 901, the base station receives data symbols and reference signals. In this case, the data symbols and the reference signals are those that have been spread to codebooks and mapped onto resource regions. In this case, the data symbols and the reference signals may include signals transmitted from a plurality of terminals, and the signals transmitted from the plurality of terminals may overlap one another in the same resource region. In addition, the reference signals may be received through a first OFDM symbol in a given resource section.

In step 903, the base station detects an active terminal by using the data symbols. More specifically, the base station may determine a first reception signal model regarding all data transmission regions by using the received data symbols, and may determine a second reception signal model by rearranging the first reception signal model. In addition, the base station may detect at least one active terminal by performing an operation (for example, a correlation operation, compressive sensing) of determining the presence/absence of a signal regarding the second reception signal model.

In step 905, the base station may estimate a channel by using the reference signals and the data symbols. More specifically, the base station may estimate a product of a data symbol and a channel of the active terminal by using an index of the detected active terminal. In addition, the base station may estimate a channel in the first OFDM symbol by using the reference signal, and then, may perform channel estimation regarding all active terminals detected by using the data symbols.

In step 907, the base station performs data symbol decoding. That is, the base station may detect data that the active terminal has transmitted through decoding, by using the data symbols of the detected active terminal and the estimated channel.

Figure 10:
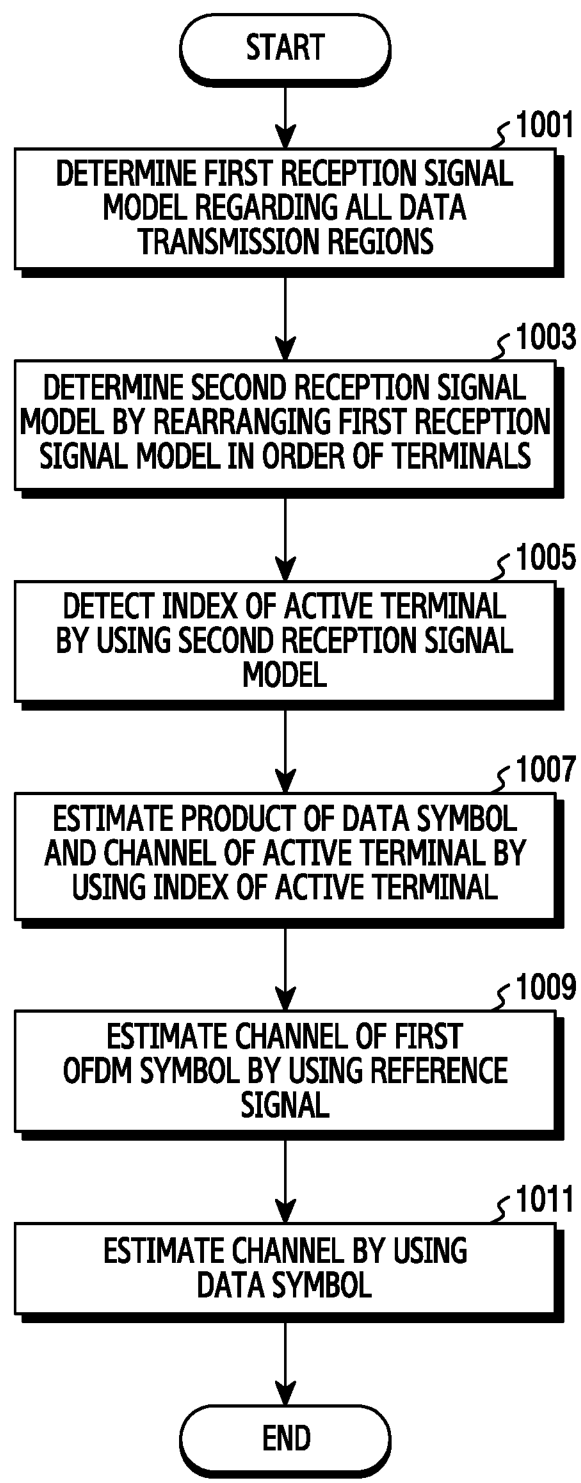
FIG. 10 is a view illustrating a flowchart of a base station which performs active user detection (AUD) and channel estimation (CE) in a wireless communication system according to various embodiments of the present disclosure.

FIG. 10 is a view illustrating a flowchart of a base station which performs active user detection and channel estimation in a wireless communication system according to various embodiments of the present disclosure. FIG. 10 illustrates an example of an operating method of the base station 110.

Referring to FIG. 10, in step 1001, the base station determines a first reception signal model regarding all data transmission regions. More specifically, the base station may determine the first reception signal model by using received data symbols. For example, the first reception signal model may be a matrix in which received data symbols are arranged in order of indexes of the data transmission regions. Herein, the received data symbol may be formed of a data symbol that is transmitted by a terminal, a codebook allocated to the terminal, and a channel and a noise of the terminal.

In step 1003, the base station determines a second reception signal model by rearranging the first reception signal model in order of terminals. That is, to detect an index of an active terminal, the base station rearranges received data symbols included in the first reception signal model in order of terminals. Accordingly, in the case of the second reception signal model, data symbols received from one terminal may be adjacent to one another. In this case, the second reception signal model may include a sensing matrix and channels and data symbols of the terminals that are rearranged.

In step 1005, the base station detects an index of an active terminal by using the second reception signal model. More specifically, the base station performs compressive sensing by using the sensing matrix of the second reception signal model. The base station may detect the index of the active terminal through compressive sensing. In this case, the base station may use an orthogonal matching pursuit (OMP) as a compressive sensing algorithm, and according to various embodiments of the present disclosure, the base station may use other compressive sensing algorithms.

In step 1007, the base station estimates a product of a data symbol and a channel of the active terminal by using the index of the active terminal. More specifically, the base station may estimate the product of the data symbol and the channel corresponding to the active terminal, by using the index of the detected active terminal. The base station may use a linear minimum mean square error (LMMSE) technique to estimate the product of the data symbol and the channel corresponding to the active terminal. The base station may complete active user detection by estimating the product of the data symbol and the channel corresponding to the active terminal. According to various embodiments of the present disclosure, the base station may use other techniques in addition to the LMMSE.

In step 1009, the base station may perform channel estimation of the first OFDM symbol by using a reference signal. More specifically, the base station may perform channel estimation independently regarding the detected active terminals. First, the base station may perform channel estimation by using reference signals of all active terminals, which are transmitted to the first OFDM symbol. In this case, the base station may generate reference signals regarding all active terminals by circularly shifting one zadoff-chu sequence according to respective active terminals.

In step 1011, the base station performs channel estimation by using data symbols. More specifically, the base station may perform channel estimation by using a virtual reference signal or may perform channel estimation by using doppler estimation. For example, the base station may perform channel estimation by using a virtual reference signal, by performing a message passing algorithm (MPA) only regarding data symbols corresponding to a region having a good channel state. In addition, the base station may perform channel estimation by using doppler estimation, by detecting data transmitted to a last OFDM symbol and estimating a doppler frequency by using the detected data as a virtual reference signal.

Figure 11:
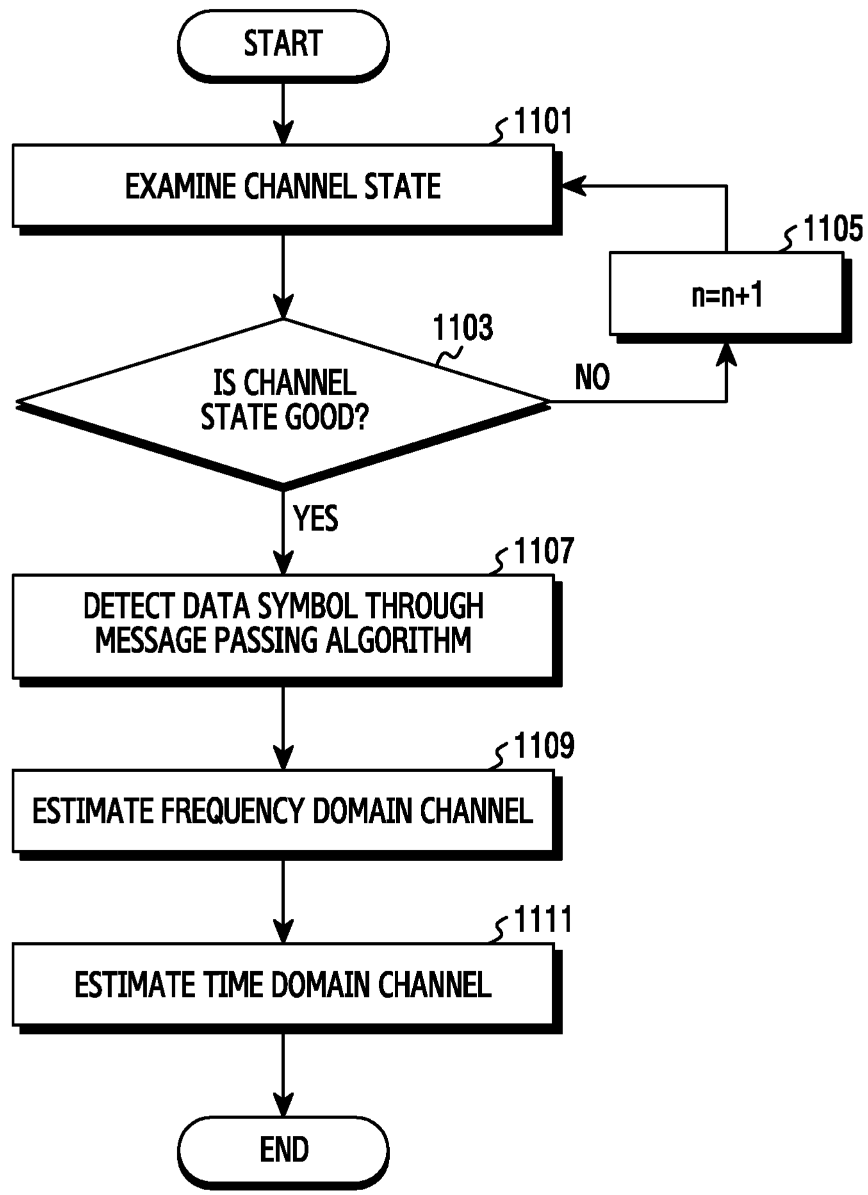
FIG. 11 is a view illustrating a flowchart of a base station which performs active user detection by using a virtual reference signal in a wireless communication system according to various embodiments of the present disclosure.

FIG. 11 is a view illustrating a flowchart of a base station which performs channel estimation by using a virtual reference signal in a wireless communication system according to various embodiments of the present disclosure. FIG. 11 illustrates an example of an operating method of the base station 110.

Referring to FIG. 11, in step 1101, the base station examines a channel state. More specifically, the base station may examine the channel state by using a magnitude of a channel as a criterion for determining how the channel state is good.

In step 1103, the base station determines whether the channel state is good. For example, the base station may determine whether the channel state is good by comparing a channel magnitude of an i-th terminal and a predetermined threshold, comparing a channel magnitude of an i-th active terminal and a channel magnitude of a j-th active terminal, or comparing channel magnitudes of all active terminals and a predetermined threshold. When the channel magnitude is larger than channel magnitudes of other terminals or the threshold, the base station may determine that the channel state is good. When the channel state is not good, the base station may increase n by 1 in step 1105 and may return to step 1101. When the channel state is good, the base station may perform a message passing algorithm in step 1107.

In step 1107, the base station performs data symbol detection through the message passing algorithm. More specifically, the base station may perform data symbol detection of a data transmission region with respect to the active terminal having a good channel state through the message passing algorithm.

In step 1109, the base station performs frequency domain channel estimation. More specifically, since the channel state is good and thus a probability that data symbols are properly detected is high, the base station may perform channel estimation in a frequency domain through an LMMSE technique by using the detected data symbols as a virtual reference signal.

In step 1111, the base station performs time domain channel estimation. More specifically, the base station may perform channel estimation in a time domain by using a channel of each active terminal estimated by using a channel and a reference signal of a terminal corresponding to the first OFDM symbol, and by using the channel estimated in the frequency domain. In this case, the base station may perform channel estimation in the time domain by using channel impulse response (CIR) estimation.

Figure 12:
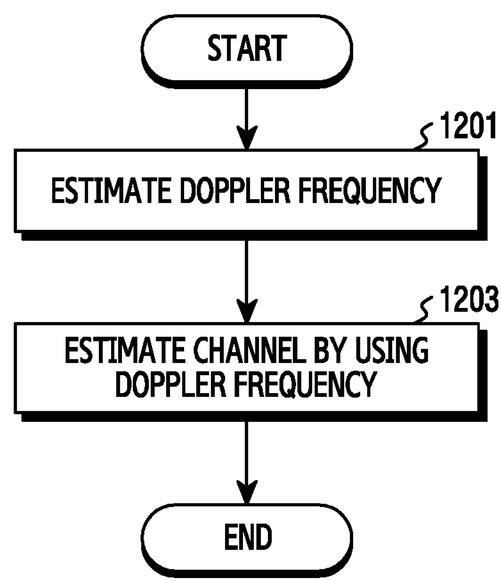
FIG. 12 is a view illustrating a flowchart of a base station which performs active user detection by using doppler estimation in a wireless communication system according to various embodiments of the present disclosure.

FIG. 12 is a view illustrating a flowchart of a base station which performs channel estimation by using doppler estimation in a wireless communication system according to various embodiments of the present disclosure. FIG. 12 illustrates an example of an operating method of the base station 10.

Referring to FIG. 12, in step 1201, the base station performs doppler frequency estimation. More specifically, the base station may detect data transmitted to the last OFDM symbol by using a channel estimation value vector of the first OFDM symbol. Thereafter, the base station may detect a frequency domain channel of the last OFDM symbol through the LMMSE technique by using the detected data as a virtual reference signal. The base station may estimate a doppler frequency by using the channel estimation value vector of the first OFDM symbol and the frequency domain channel of the last OFDM symbol.

In step 1203, the base station performs channel estimation by using the doppler frequency. More specifically, the base station may perform frequency domain channel estimation corresponding to the other OFDM symbols except for the first and last OFDM symbols, by using the channel estimation value vector of the first OFDM symbol, the frequency domain channel of the last OFDM symbol, and the doppler frequency.

Figure 13:
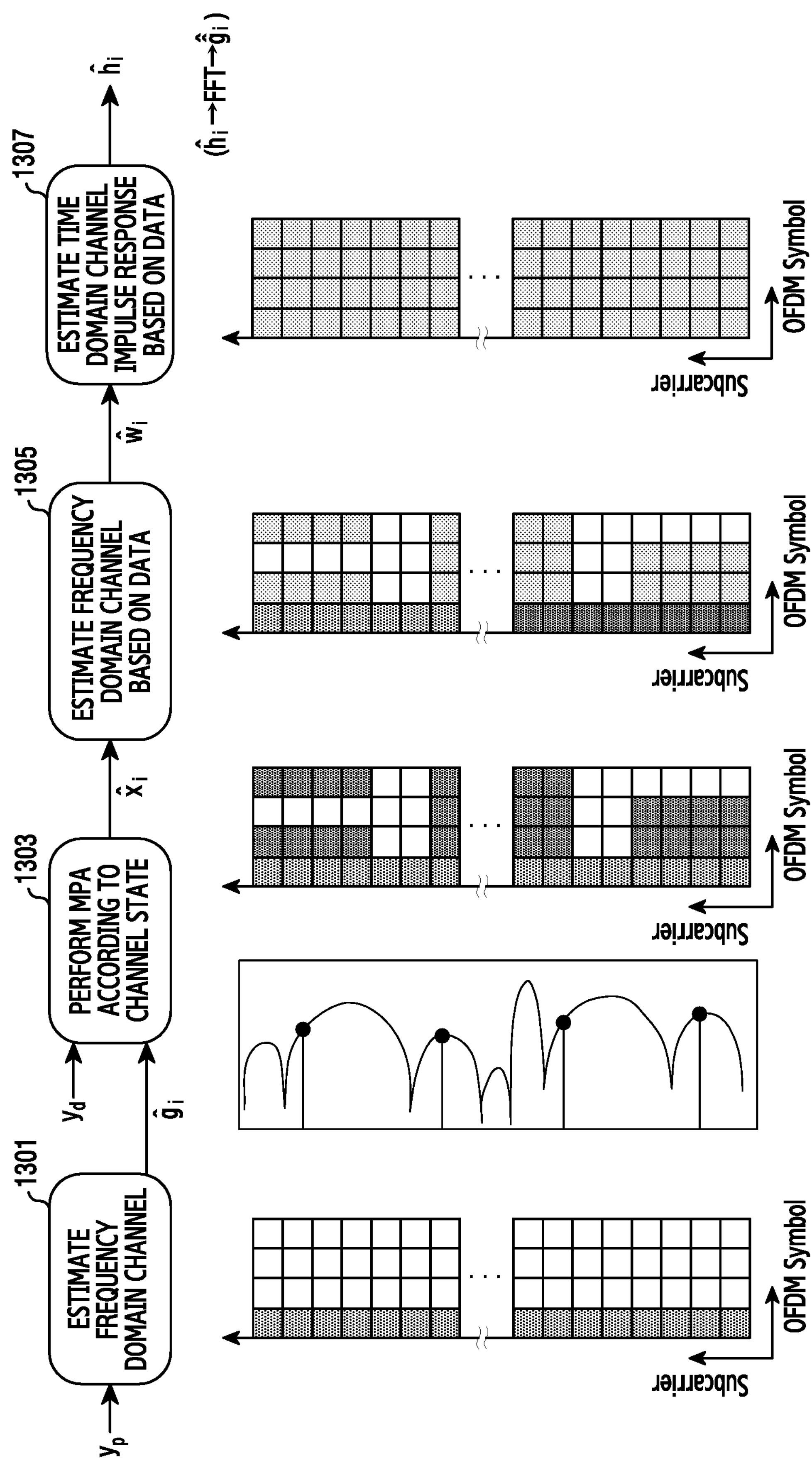
FIG. 13 is a view illustrating an example of active user detection by using a virtual reference signal in a wireless communication system according to various embodiments of the present disclosure.

FIG. 13 is a view illustrating an example of channel estimation by using a virtual reference signal in a wireless communication system according to various embodiments of the present disclosure. FIG. 13 illustrates an example of an operating method of the base station 110. In FIG. 13, the horizontal axis of graphs in step S1301 to step S1307 indicates an OFDM symbol, and the vertical axis indicates a sub carrier.

Referring to FIG. 13, in step 1301, the base station performs frequency domain channel estimation. That is, the base station may perform frequency domain channel estimation by using reference signals of active terminals positioned in the first OFDM symbol, and channels of the terminals. For example, the base station may generate reference signals for all active terminals by circularly shifting one zadoff-chu sequence according to each active terminal, and may perform frequency domain channel estimation through the LMMSE technique.

In step 1303, the base station may perform a message passing algorithm according to a channel state. For example, the base station may determine whether the channel state is good by comparing a channel magnitude of an i-th terminal and a predetermined threshold, comparing a channel magnitude of an i-th active terminal and a channel magnitude of a j-th active terminal, or comparing channel magnitudes of all active terminals and a predetermined threshold. In addition, the base station may perform the message passing algorithm only regarding an active terminal having a good channel state to exactly detect data symbols. In this case, data symbols detected through the message passing algorithm may be used as a virtual reference signal for frequency domain channel estimation.

In step 1305, the base station performs data-based frequency domain channel estimation. More specifically, the base station may use relatively exact data symbols that are detected as a result of comparing channel states, as a virtual reference signal. In addition, the base station may perform frequency domain channel estimation by using the virtual reference signal. For example, the base station may perform frequency domain channel estimation through the LMMSE technique.

In step 1307, the base station performs data-based time domain channel impulse response estimation. More specifically, the base station may collect frequency domain channel information which is calculated through channel estimation in the frequency domain. Thereafter, the base station may perform time domain channel impulse response estimation based on the collected information. Finally, the base station may estimate frequency domain channel information by performing fast Fourier transform (FFT) with respect to the estimated time domain channel impulse response.

Figure 14:
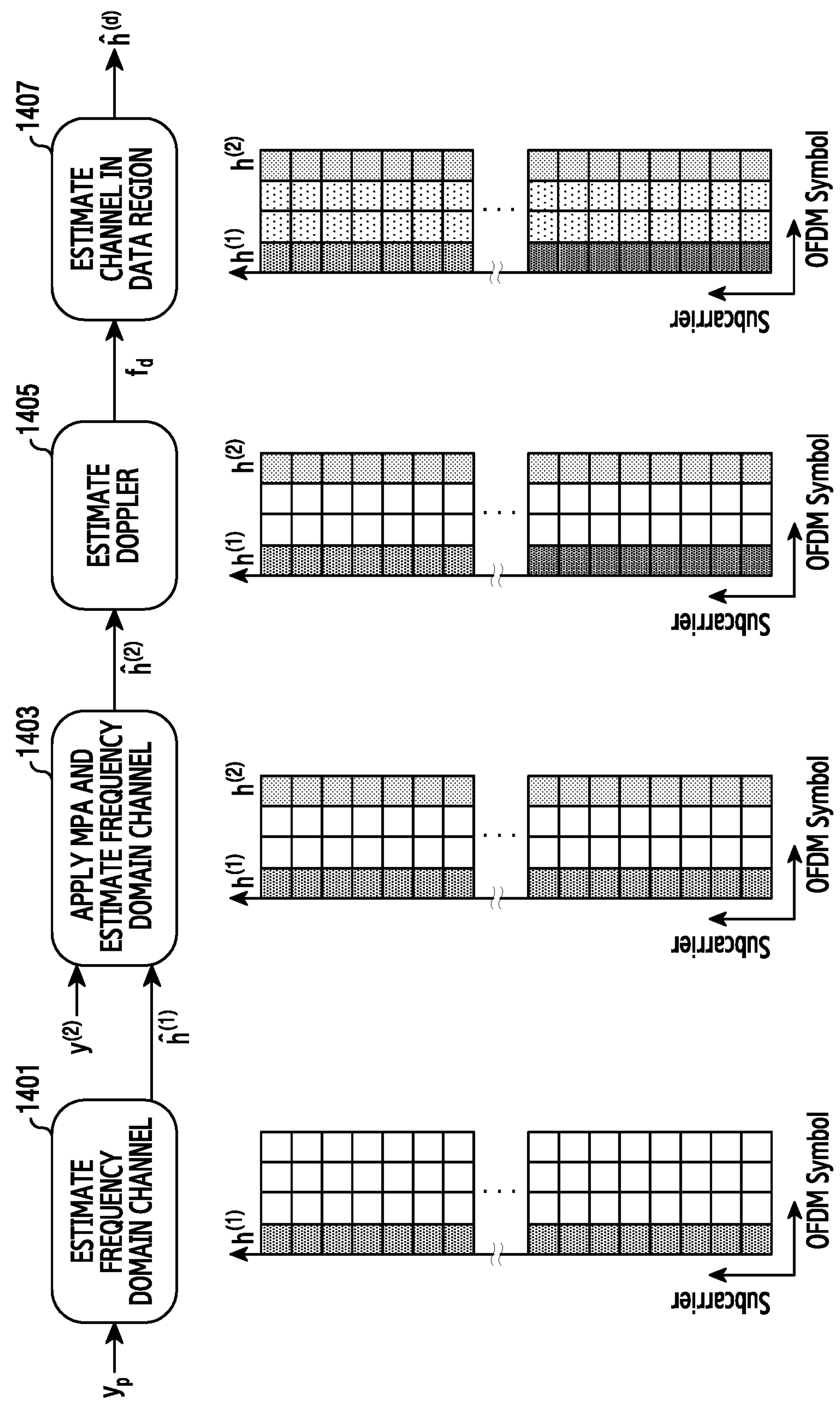
FIG. 14 is a view illustrating an example of active user detection by using doppler estimation in a wireless communication system according to various embodiments of the present disclosure.

FIG. 14 is a view illustrating an example of active user detection by using doppler estimation in a wireless communication system according to various embodiments of the present disclosure. FIG. 14 illustrates an example of an operating method of the base station 110.

Referring to FIG. 14, in step 1401, the base station performs frequency domain channel estimation. More specifically, the base station may perform frequency domain channel estimation by using reference signals of active terminals positioned in the first OFDM symbol, and channels of the terminals. For example, the base station may generate reference signals for all active terminals by circularly shifting one zadoff-chu sequence according to each active terminal, and may perform frequency domain channel estimation through the LMMSE technique.

In step 1403, the base station may apply a message passing algorithm, and may perform frequency domain channel estimation. More specifically, the base station may apply the message passing algorithm to data symbols of the last OFDM symbol by using a channel estimation value estimated through the first OFMD symbol. Subsequently, the base station may perform frequency domain channel estimation of the last OFDM symbol by using data detected through the message passing algorithm.

In step 1405, the base station performs doppler estimation. More specifically, the base station may estimate a doppler frequency by using the channel estimation value regarding the first OFDM symbol and a channel estimation value estimated through the last OFDM symbol.

In step 1407, the base station performs channel estimation in a data region. More specifically, the base station may perform frequency domain channel estimation with respect to other OFDM symbols except for the first and last OFDM symbols, by using the channel estimation value regarding the first OFDM symbol, the channel estimation value estimated through the last OFDM symbol, and the doppler frequency.

As in the above-described embodiments, the terminal may generate a codebook, map codes included in the codebook onto data symbols, and transmit the data symbols spread by using the codebook and a reference signal to the base station. The base station may detect an active terminal by generating a first reception signal model and a second reception signal model by using the received data symbols. Subsequently, the base station may perform channel estimation of the active terminal using a virtual reference signal, or doppler estimation by using a received reference signal. By dosing so, the system according to various embodiments can enhance performance of active user detection by increasing the number of data symbols, and can flexibly design arrangements and structures of reference signals by independently performing active user detection and channel estimation.

Hereinafter, the above-described procedures of uplink transmission and active user detection, and channel estimation will be described in more detail with reference to the drawings and equations. In the following description, an active terminal is detected according to a compressive sensing technique by way of an example.

A first embodiment of the present disclosure may include a transmitter and a receiver. At the transmitter, each terminal may transmit data symbols and reference signals by using a NOMA codeword for data symbol transmission and a zadoff-chu sequence for reference signal transmission. At the receiver, a base station may perform active user detection by using received data symbols, and may perform channel estimation with respect to an estimated active terminal.

Thereafter, the base station may detect data symbols of the active terminals based on the estimated channel information.

The terminal may use a symbol modulated in a quadrature phase shift keying (QPSK) method as data to be transmitted. In this case, respective data symbols may be spread by a NOMA codeword given to each terminal, and then may be transmitted while overlapping on the same resource region. In addition, the terminal may arbitrarily select regions for transmitting data symbols in every transmission frame. When the terminal detects the transmitted data symbols by using a message passing algorithm, the respective data symbols are detected independently. However, when the base station performs active user detection by using data symbols, all transmitted data symbols may be used as values for active user detection.

Hereinafter, a process of detecting an active terminal will be described in more detail.

When the total number of regions for transmitting data is M, a data symbol received at a base station side may be expressed by Equation 1 presented below:

$$y_d^{(m)} = \sum_{i=1}^{N} \mathrm{diag}(c_i^{(m)}) g_i^{(m)} x_i^{(m)} + v^{(m)} \qquad \text{Equation 1}$$

In Equation 1, $y_d^{(m)}$ is a data symbol of an m-th region received at a base station side, $c_i^{(m)}$ is a NOMA codeword of an i-th terminal in the m-th region, $g_i^{(m)}$ is a channel of the i-th terminal in the m-th region, $x_i^{(m)}$ is a transmission data symbol of the i-th terminal in the m-th region, and $v^{(m)}$ is an additive white gaussian noise (AWGN) vector.

A codebook matrix in which NOMA codewords of terminals in the m-th region are collected is indicated by $C_{(L,N)}^{(m)}$. For example, an example of the codebook matrix when L=4 and N=6 may be expressed by Equation 2 presented below:

$$C_{(4,6)}^{(m)} = \begin{bmatrix} w_0 & w_1 & w_2 & 0 & 0 & 0 \\ w_0 & 0 & 0 & w_1 & w_2 & 0 \\ 0 & w_0 & 0 & w_1 & 0 & w_2 \\ 0 & 0 & w_0 & 0 & w_1 & w_2 \end{bmatrix} \qquad \text{Equation 2}$$

In Equation 2, $C_{(L,N)}^{(m)}$ is a codebook matrix in which NOMA codewords of terminals in the m-th region are collected, $w_0$, $w_1$, and $w_2$ are weights constituting a codebook.

Since the number of active terminals is smaller than the total number of terminals, the base station may perform active user detection by using a compressive sensing algorithm. In this case, codebooks of respective data transmission regions may be stacked one on another and may be used as a sensing matrix. As the sensing matrix is randomly generated, a restoring probability of support may increases, and different codebooks may be used for respective data transmission regions.

The terminal may consider the following two embodiments as a method for generating a codebook.

In the first embodiment, the terminal may generate a new codebook $C_{(L,N)}$ for every data transmission region.

In the second embodiment, the terminal may generate S number of base code books $C_{(L,N),1}$, $C_{(L,N),2}$, . . . $C_{(L,N),S}$, and may circularly shift the respective base codebooks, and may use the shifted base codebooks as codebooks for respective data transmission regions. In this case, the terminal may perform a circular shift by performing a column-wise shift, a row-wise shift, and a column and row-wise shift in a 2D form to move both in the row direction and the column direction. The number of different codebooks that may be made by circularly shifting one codebook in row and column directions is L×N. In this case, a codebook matrix that is made by circularly shifting $C_{(L,N)}$ i times in the row direction and j times in the column direction is indicated by $C_{(L,N)}^{(i,j)}$. For example, when L=4 and N=6, an example of the codebook matrix may be expressed by Equation 3:

$$C_{(4,6)}^{(m)} = \begin{bmatrix} w_0 & w_1 & w_2 & 0 & 0 & 0 \\ w_0 & 0 & 0 & w_1 & w_2 & 0 \\ 0 & w_0 & 0 & w_1 & 0 & w_2 \\ 0 & 0 & w_0 & 0 & w_1 & w_2 \end{bmatrix} \qquad \text{Equation 3}$$

$$C_{(4,6)}^{(1,1)} = \begin{bmatrix} w_2 & 0 & 0 & w_0 & 0 & w_1 \\ 0 & w_0 & w_1 & w_2 & 0 & 0 \\ 0 & w_0 & 0 & 0 & w_1 & w_2 \\ w_2 & 0 & w_0 & 0 & w_1 & 0 \end{bmatrix}$$

$$C_{(4,6)}^{(2,1)} = \begin{bmatrix} w_2 & 0 & w_0 & 0 & w_1 & 0 \\ w_2 & 0 & 0 & w_0 & 0 & w_1 \\ 0 & w_0 & w_1 & w_2 & 0 & 0 \\ 0 & w_0 & 0 & 0 & w_1 & w_2 \end{bmatrix}$$

$$C_{(4,6)}^{(1,2)} = \begin{bmatrix} w_1 & w_2 & 0 & 0 & w_0 & 0 \\ 0 & 0 & w_0 & w_1 & w_2 & 0 \\ w_2 & 0 & w_0 & 0 & 0 & w_1 \\ 0 & w_2 & 0 & w_0 & 0 & w_1 \end{bmatrix}$$

In Equation 3, $C_{(L,N)}^{(i,j)}$ is a codebook matrix that is made by circularly shifting a base codebook $C_{(L,N)}^{(i,j)}$ i times in the row direction and j times in the column direction, and $w_0$, $w_1$, and $w_2$ are weights of a codebook.

For example, when the total number of data symbols transmitted is 90 and the size of a used codebook is 4×6, the terminal may spread only 24 data symbols with one base codebook. Accordingly, at least four base codebooks are required. The minimum number of base codebooks required for given transmission data symbols may be expressed by Equation 4 presented below:

$$S = \mathrm{ceil}\left(\frac{N_x}{LN}\right) \qquad \text{Equation 4}$$

In Equation 4, Nx is the number of given transmission data symbols. S is the minimum number of base codebooks required for the number of given transmission data symbols Nx, L is the number of rows of the codebook matrix, N is the number of columns of the codebook matrix, and ceil is a ceiling function.

By using the above-described method, the terminal may generate different codebooks for the respective data regions, and then requires a process of allocating the codebooks. In this case, the terminal may consider the following two embodiments as a method for allocating the generated codebooks.

In one embodiment, the terminal may allocate the different codebooks to the respective transmission data symbols, and then may perform resource mapping. This is illustrated in FIG. 7A. The terminal may assign indexes 1 to M to respective transmission data symbols. The transmission data symbols assigned indexes 1 to M may be expressed by x1, x2, . . . , xM. In this case, codebooks allocated to the respective data symbols may be expressed by $C_{(L,N)}^{(1)}$, $C_{(L,N)}^{(2)}$, . . . , $C_{(L,N)}^{(M)}$. In the first example of allocating the codebooks, the terminal may make the indexes of the data symbols coincide with the indexes of the codebooks. That is, the codebooks may be allocated like $x_1 \rightarrow C_{(L,N)}^{(1)}$, $x_2 \rightarrow C_{(L,N)}^{(2)}$, . . . , $x_M \rightarrow C_{(L,N)}^{(M)}$. In the second example of allocating the codebooks, the terminal may allocate the codebooks by using an interleaver. For example, when the interleaver is Π=[32 3 . . . 7], the terminal may allocate the codebooks like $x_1 \rightarrow C_{(L,N)}^{(32)}$, $x_2 \rightarrow C_{(L,N)}^{(3)}$, . . . $x_M \rightarrow C_{(L,N)}^{(7)}$.

In the other embodiment, the terminal may map the generated codebooks onto respective given resource positions, and then may allocate the codebooks to the respective transmission data symbols. This is illustrated in FIG. 7B.

Each active terminal may transmit data by using the codebooks for the respective transmission regions, which have been generated and allocated. In this case, an active terminal detector at the base station side may detect active terminals by performing compressive sensing by using codebook information of the terminals as a sensing matrix. A data symbol received at the base station side may be expressed by Equation 5 presented below:

$$\begin{aligned} y_d^{(m)} &= [\mathrm{diag}(c_1^{(m)}) \cdots \mathrm{diag}(c_N^{(m)})]\begin{bmatrix} g_1^{(m)}x_1^{(m)} \\ \vdots \\ g_1^{(m)}x_1^{(m)} \end{bmatrix} + v^{(m)} \\ &= C_m d_m + v_m \end{aligned} \quad \text{Equation 5}$$

In Equation 5, $y_d^{(m)}$ is a data symbol of an m-th region received at a base station side, $c_i^{(m)}$ is a NOMA codeword of an i-th terminal in the m-th region, $g_i^{(m)}$ is a channel of the i-th terminal in the m-th region, $x_i^{(m)}$ is a transmission data symbol of the i-th terminal in the m-th region, $v_i^{(m)}$ is an AWGN vector, and Cm is a codebook matrix of the m-th region, dm is a product of a channel of a terminal in the m-th region and a transmission data symbol of the terminal in the m-th region, and vm is an AWGN matrix in the m-th region.

When a reception signal in all data transmission regions is $y_D=[y_D^{(1)T} \ldots y_D^{(M)T}]^T$, yD may be expressed by Equation 6 presented below:

$$y_D = \mathrm{diag}(C_1, \ldots , C_M)\begin{bmatrix} d_1 \\ \vdots \\ d_M \end{bmatrix} + \begin{bmatrix} v_1 \\ \vdots \\ v_M \end{bmatrix} \quad \text{Equation 6}$$

In Equation 6, yD is a reception signal in all data transmission regions, Cn is a codebook matrix of the n-the region, dm is a product of a channel of a terminal in the m-th region and a transmission data symbol of the terminal in the m-th region, and vn is an AWGN vector in the n-th region.

To achieve the object of detecting an index of an active terminal by using compressive sensing, the base station may rearrange a vector $[d_1^T \ldots d_M^T]^T$ arranged in order of data transmission regions (1, . . . , M) in order of terminals (1, . . . , N). In this case, a reception signal in all data transmission regions may be expressed by Equation 7 presented below:

$$y_D = [R_1 \cdots R_N]\begin{bmatrix} z_1 \\ \vdots \\ z_N \end{bmatrix} + \begin{bmatrix} v_1 \\ \vdots \\ v_M \end{bmatrix} \quad \text{Equation 7}$$

In Equation 7, yD is a reception signal in all data transmission regions, $[R_1 \ldots R_N]$ is a sensing matrix, zn is a product of a channel of a terminal in the rearranged n-th region and a transmission data symbol of the terminal in the n-th region, and vn is an AWGN vector in the n-th region.

The base station may perform compressive sensing by using the reception data symbol yD and the sensing matrix $[R_1 \ldots R_N]$. For example, the base station may use an OMP method as a compressive sensing algorithm. Subsequently, the base station may estimate a value of an active terminal (a value in the form of a product of a data symbol and a channel) through the LMMSE technique after detecting the index of the active terminal. Since the base station independently performs active user detection without depending on performance of channel estimation, unlike the method of performing active user detection and channel estimation based on the reference signal, the performance of active user detection is enhanced as the number of data symbols increases. In addition, there are advantages of reducing an overhead of the reference signal and increasing a degree of freedom in a structure and arrangement of the reference signal.

Thereafter, the base station may independently estimate channels with respect to the detected active terminals. The base station may perform channel estimation by transmitting reference signals of all active terminals to the first OFDM symbol in the form of NOMA, first, in order to reduce a transmission delay. In this case, the base station may circularly shift one zadoff-chu sequence according to each active terminal, and may use the shifted zadoff-chu sequence as a reference signal of each active terminal. When a channel of the i-th terminal corresponding to the first OFDM symbol is h and a reception signal of a reference signal is yp, a channel of each active terminal estimated by the LMMSE technique may be expressed by Equation 8 presented below:

$$\hat{g}_i = E[h'_i y_p^H]E[y_p y_p^H]^{-1} y_p \quad \text{Equation 8}$$

In Equation 8, $\hat{g}_i$ is a channel of each active terminal estimated by the LMMSE technique, $h'_i$ is a channel of the i-th terminal corresponding to the first OFDM symbol, and yp is a reception signal of a reference signal.

The base station may more exactly estimate channels corresponding to data transmission regions by using $\hat{g}_i$. In this case, the base station may consider the following two embodiments as a method of performing channel estimation.

In an embodiment, the base station may perform channel impulse response estimation based on a virtual reference signal, An operating procedure of the base station is illustrated in FIG. 13. The base station may perform data symbol detection of the data transmission region through a message passing algorithm by using $\hat{g}_i$. In this case, the base station may not detect all of the data symbols, and may perform the message passing algorithm only with respect to data symbols corresponding to regions having a good channel state. Since a probability that data symbols are properly detected is high, the base station may regard the detected data symbols as reference signals. Subsequently, a channel of a frequency domain that may be estimated by the base station by using the LMMSE technique may be expressed by Equation 9 presented below:

$$\hat{w}_i = E[h''_i y_{\tilde{d}}^H]E[y_{\tilde{d}} y_{\tilde{d}}^H]^{-1} y_{\tilde{d}} \quad \text{Equation 9}$$

In Equation 9, $\hat{w}_i$ is a channel of a frequency domain that may be estimated by using the LMMSE technique, $y_{\hat{d}}$ is a data reception signal corresponding a region having a good channel state, except for the first OFDM symbol region, and $h''_i$ is a channel extracting only a region having a good channel state except for the first OFDM symbol region.

Thereafter, channel impulse response estimation in a time domain may be performed by using $\hat{g}_i$ and $\hat{w}_i$. When $\hat{u}_i=[\hat{g}_i^T\ \hat{w}_i^T]^T$, a relationship between $\hat{u}_i$ and a channel impulse response vector $\hat{h}_i$ in the time domain may be expressed by Equation 10 presented below:

$$\hat{u}_i=\Phi F_{N_{FFT}}\rho\hat{h}_i \qquad \text{Equation 10}$$

In Equation 10, $\hat{u}_i=[\hat{g}_i^T\ \hat{w}_i^T]^T$, $\Phi$ is a matrix indicating a position of a sub carrier of each channel component estimated on a frequency axis, $F_{N_{FFT}}$ is a Fourier transform matrix having a size of NFFT, NFFT is an FFT size, and $\rho$ is a matrix indicating a position of a channel impulse response tap in the total FFT size.

Since a rearrangement procedure is required as in active user detection, the base station may rearrange $\hat{h}_i$ arranged in order of OFDM symbol indexes in order of channel impulse response tap indexes. Subsequently, the base station may perform compressive sensing by using the rearranged $\Phi F_{N_{FFT}}\rho$ as a sensing matrix. When FFT is applied to $\hat{h}_i$ which is calculated through compressive sensing, a more exact channer $\hat{\hat{g}}_i$ may be finally obtained.

The base station may use a magnitude of a channel as the above-described criterion for determining whether a channel state is good. For example, according to a first criterion, the base station may perform a $(|h_i|>\alpha_i)$ message passing algorithm only in a data region in which a channel magnitude of the i-th active terminal is larger than a predetermined threshold $\alpha_i$. According to a second criterion, the base station may perform a $(|h_i|>\alpha_j\times|h_j|)$ message passing algorithm only in a data region in which the channel magnitude of the i-th active terminal is larger than a channel magnitude of the j-th active terminal. According to a third criterion, the base station may perform a $(|h_i|>\alpha_i, \ldots, |h_N|>\alpha_N)$ message passing algorithm only in a data region in which channel magnitudes of all active terminals are larger than the predetermined threshold.

In the other embodiment, the base station may perform channel estimation based on doppler estimation. An operating procedure of the base station is illustrated in FIG. 14. The base station may detect data transmitted to the last OFDM symbol by using a channel estimation value vector $\hat{h}^{(1)}$ corresponding to the first OFDM symbol. In addition, the base station may estimate a frequency domain channel $\hat{h}^{(2)}$ of the last OFDM symbol through the LMMSE technique by using the detected data as a reference signal, and then may estimate a doppler frequency fd by using $\hat{h}^{(1)}$ and $\hat{h}^{(2)}$ information. Subsequently, the base station may estimate a frequency domain channel corresponding to the other OFDM symbols except for the first and last OFDM symbols based on $\hat{h}^{(1)}$, $\hat{h}^{(2)}$, and fd.

As described above, the terminal may generate and determine a codebook for each data symbol, and transmit data symbols spread by using the codebook and a reference signal to the base station. The base station may detect an active terminal by generating a first reception signal model and a second reception signal mode by using the received data symbols. Subsequently, the base station may perform channel estimation of the active terminal using a virtual reference signal, or doppler estimation by using the received reference signal. In addition, the present disclosure further suggests an embodiment in which a terminal transmits data symbols spread by using a codebook and a reference signal to a base station, and the base station performs active user detection and channel estimation, simultaneously, by using the received reference signal. Hereinafter, embodiments in which a base station performs active user detection and channel estimation simultaneously will be described.

Figure 15:
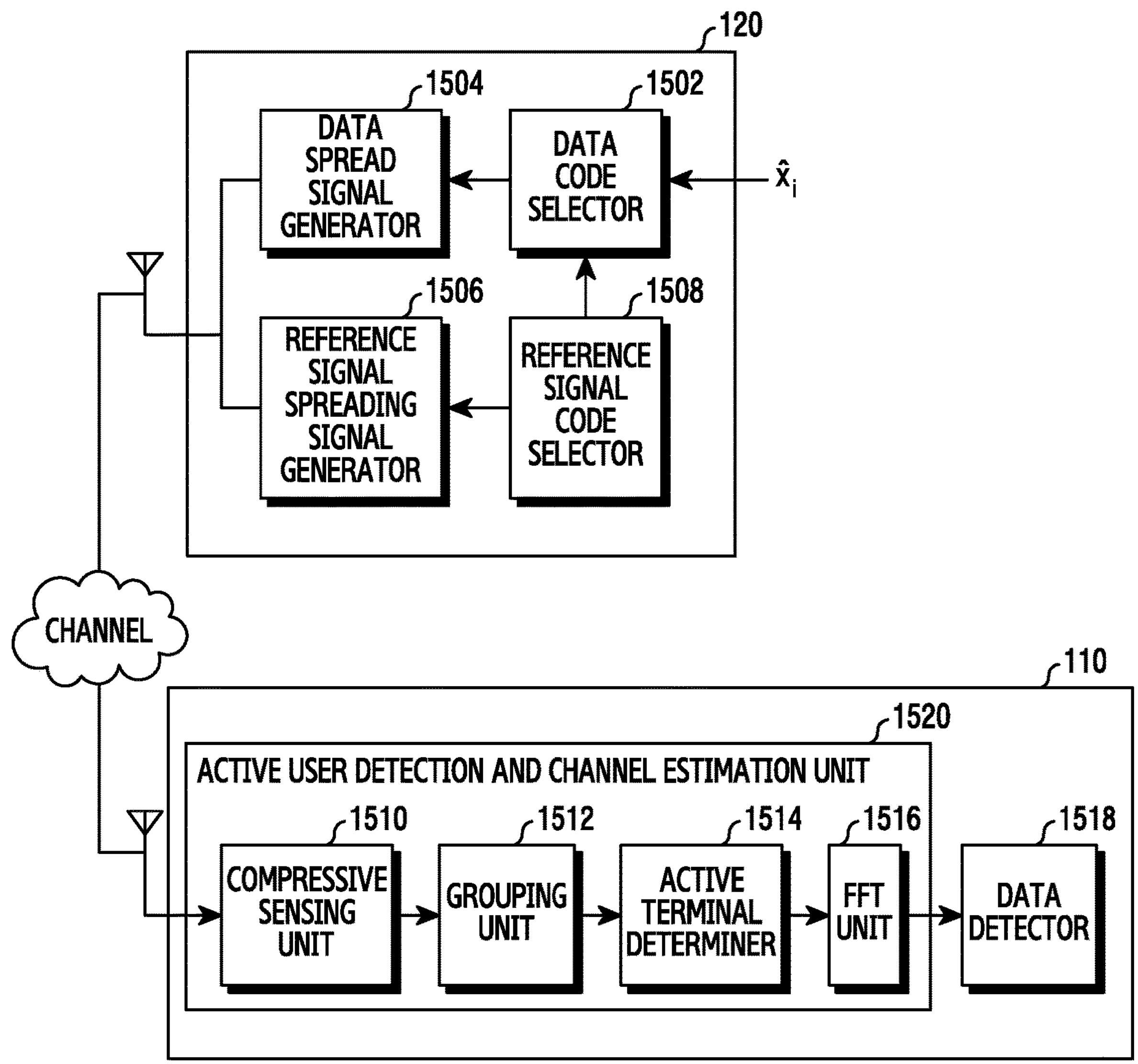
FIG. 15 is a view illustrating functional block configurations of a terminal and a base station in a wireless communication system according to various embodiments of the present disclosure.

FIG. 15 is a view illustrating a functional block diagram of a terminal and a base station in a wireless communication system according to various embodiments of the present disclosure. FIG. 15 illustrates an example of a functional block configuration of the terminal 120 and the base station 110. The term "unit" or terms ending with suffixes "-er," and "-or" used in the following description refer to a unit processing at least one function or operation, and may be implemented by hardware, software, or a combination of hardware and software.

Referring to FIG. 15, the terminal 120 includes a data code selector 1502, a data spread signal generator 1503, a reference signal spread signal generator 1506, and a reference signal code selector 1508. The data code selector 1502 selects a code to be applied to a data symbol from a base codebook. Herein, the code may be indicated by a "sequence" or "signature." The data spread signal generator 1504 generates a data spread signal by spreading data by using the code selected by the data code selector 1502. The reference signal code selector 1508 generates a codebook for a reference signal based on the base codebook, and then selects a code for the reference signal. The reference signal spread signal generator 1506 may generate a reference signal spread signal by spreading the reference signal by using the code selected by the reference signal code selector 1508. The generated data spread signal and the reference signal spread signal may be transmitted to the base station 110 via a channel.

Referring to FIG. 15, the base station 110 includes a compressive sensing unit 1510 a grouping unit 1512, an active terminal determiner 1514, an FFT unit 1516, a data detector 1518, and an active user detection and channel estimation unit 1520. The compressive sensing unit 1510 may perform compressive sensing by using received reference signals. By doing so, the compressive sensing unit 1510 may obtain an index of an active terminal, and elements including information indicating a position of a tap in a channel impulse response vector of the corresponding index. The grouping unit 1512 may group the index of the active terminal, obtained through compressive sensing, and the information indicating the position of the tap in the channel impulse response vector of the corresponding index, and thus may identify what numberth index of which terminal a corresponding element corresponds to. The active terminal determiner 1514 may determine an active terminal according to a rule of determining an active terminal based on the grouped information. For example, the active terminal determiner 1514 may select a terminal from which the greatest number of elements are obtained as an active terminal, and may select a terminal having the element restored first as an active terminal. The former may have a priority over the latter, and the base station may detect an active terminal through the above-described selecting process. Subsequently, the FFT unit 1516 may estimate a frequency response, that is, a channel, by performing FFT with respect to the channel impulse response tap of the determined active terminal. The base station 110 may include the active user detection and channel estimation unit 1520. In this case, the active user detection and channel estimation unit 1520 may include the compressive sensing unit 1510, the grouping unit 1512, the active terminal determiner 1514, and the FFT unit 1516. The active user detection and channel estimation unit 1520 may perform active user estimation and channel estimation simultaneously, and accordingly, can reduce complexity of calculation. The data detector 1518 may detect data that has been transmitted by the active terminal according to a channel which is estimated with respect to the detected active terminal. For example, the data detector 1518 may detect data by using a message passing algorithm for exchanging a probability value between a terminal node and a resource node.

Figure 16:
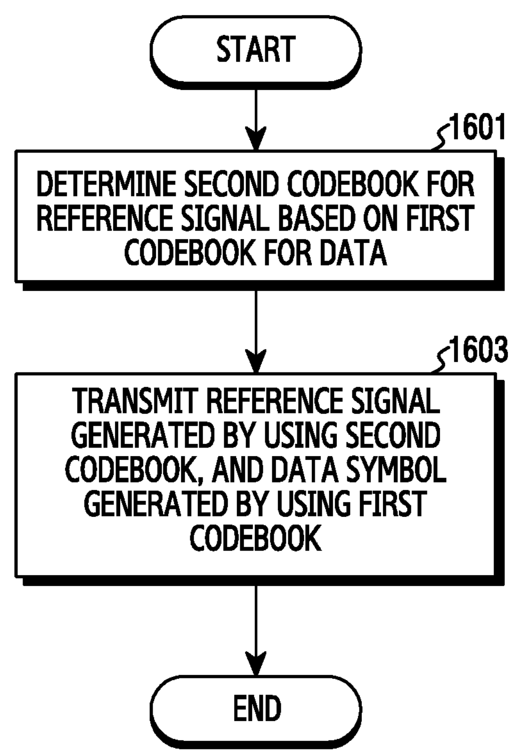
FIG. 16 is a view illustrating a flowchart of a terminal in a wireless communication system according to various embodiments of the present disclosure.

FIG. 16 is a view illustrating a flowchart of a terminal in a wireless communication system according to various embodiments of the present disclosure. FIG. 16 illustrates an example of an operating method of the terminal 120.

Referring to FIG. 16, in step 1601, the terminal determines a second codebook for reference signals based on a first codebook for data. Herein, the first codebook includes a base codebook for data symbols. In this case, the first codebook may be one selected from a plurality of codebooks. For example, the plurality of codebooks may be defined as having various sizes. In this case, the terminal may use, as the first codebook, one of the plurality of codebooks that corresponds the number of active terminals or potentially active terminals. The second codebook may be determined by extending the first codebook.

Subsequently, in step 1603, the terminal may transmit reference signals generated by using the second codebook, and data symbols generated by using the first codebook. Specifically, the terminal may select a first sequence for data symbols from the first codebook and may select a second sequence for reference signals from the second codebook, may spread the data symbols and the reference signals by using the first sequence and the second sequence, and then may transmit the data symbols and the reference signals during a given resource section (for example, at least one sub-frame, at least one slot, etc.). In this case, according to an embodiment, the reference signals may be transmitted through resources shared by a plurality of terminals. In addition, according to an embodiment, the data symbols may be transmitted through resources determined by the respective terminals. In this case, the terminal may determine a resource for transmitting data symbols by explicit signaling, or may derive a resource for transmitting data symbols based on at least one other parameter. In this case, the terminal may assign indexes 1 to R to the reference signals used for active user detection and channel estimation, and may identify the reference signals in a resource region.

Figure 17:
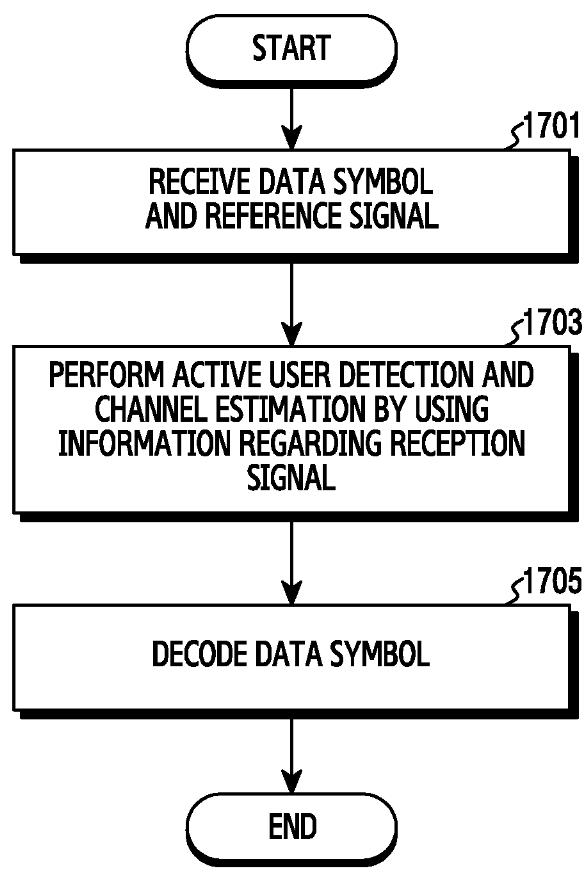
FIG. 17 is a view illustrating a flowchart of a base station in a wireless communication system according to various embodiments of the present disclosure.

FIG. 17 is a view illustrating a flowchart of a base station in a wireless communication system according to various embodiments of the present disclosure. FIG. 17 illustrates an example of an operating method of the base station 110.

Referring to FIG. 17, in step 1701, the base station receives data symbols and reference signals. Specifically, the base station may receive reference signals generated by using the second codebook, and data symbols generated by using the first codebook. In this case, the data symbols and the reference signals may be those that have been spread to the first codebook and the second codebook, respectively, and mapped onto resource regions.

In step 1703, the base station may perform active user detection and channel estimation by using information regarding reception signals. More specifically, the base station may determine information regarding reception signals indicating components included in channel impulse responses of the plurality of terminals, based on the received reference signals. That is, the base station may determine a reception signal model having respective channel impulse response taps of the terminals as elements, by using the received reference signals, and may perform active user detection and channel estimation by using the reception signal model. For example, the base station may group elements that are restored by compressive sensing a second sparse vector of the reception signal model. Finally, the base station may detect an active terminal by using the grouped elements, and also, may estimate a channel of the active terminal.

In step 1705, the base station performs decoding with respect to the data symbols. That is, the base station may detect data that has been transmitted by the active terminal through decoding by using the data symbols of the detected active terminal and the estimated channel.

Figure 18:
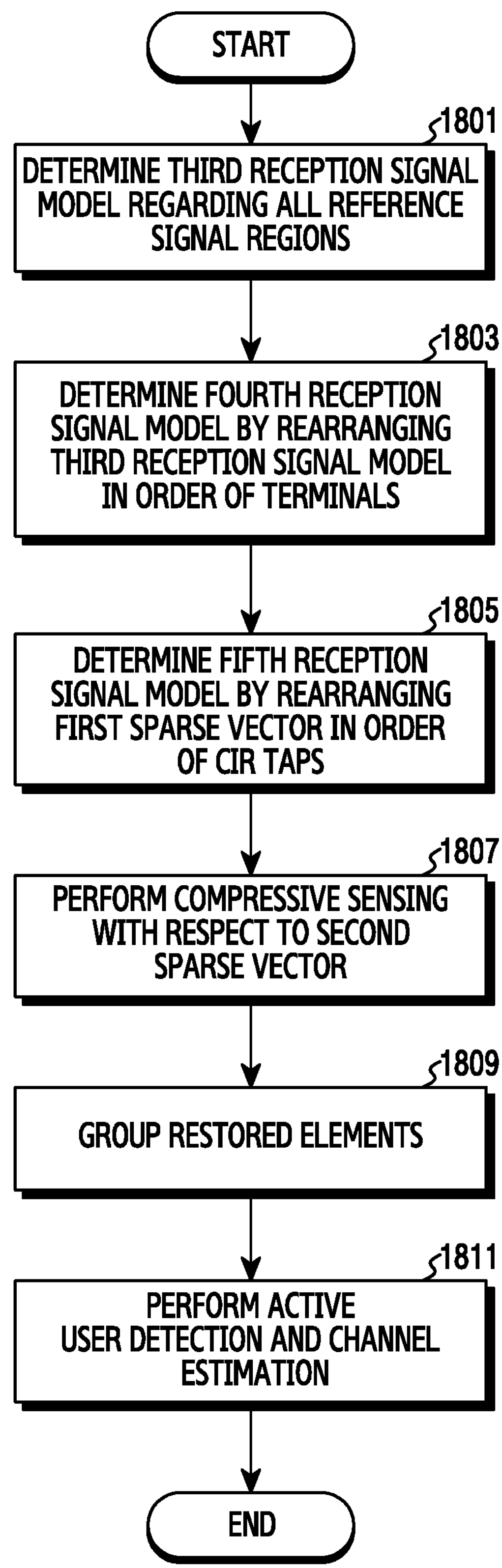
FIG. 18 is a view illustrating a flowchart of a base station which performs active user detection and channel estimation in a wireless communication system according to various embodiments of the present disclosure.

FIG. 18 is a view illustrating a flowchart of a base station which performs active user detection and channel estimation in a wireless communication system according to various embodiments of the present disclosure. FIG. 18 illustrates an example of an operating method of the base station 110.

Referring to FIG. 18, in step S1801, the base station determines a third reception signal model with respect to all reference signal regions. More specifically, the base station determines the third reception signal model by using received reference signals. For example, the third reception signal model may be a matrix in which the received reference signals are arranged in order of indexes of the reference signal regions. Herein, the received reference signal may include a reference signal symbol transmitted by the terminal, a codebook for reference signal transmission allocated to the terminal, and a channel and a noise of the terminal.

In step 1803, the base station determines a fourth reception signal model which is rearrangement of the third reception signal model in order of terminals. That is, the base station may rearrange the reference signal symbols included in the third reception signal model in order of terminals to detect an index of an active terminal. Accordingly, in the case of the fourth reception signal model, data symbols received from one terminal are adjacent to one another. In this case, the fourth reception signal model may include a sensing matrix, a first sparse vector having sparsity regarding active and inactive terminals, and a noise. When there are K number of active terminals, the first sparse vector may include K×R number of non-zero elements.

In step 1805, the base station may determine a fifth reception signal model by rearranging the first sparse vector in order of channel impulse response taps. More specifically, the base station may convert the first sparse vector included in the fourth reception signal model into a form of a product of a channel impulse response of terminals and other matrixes except for a channel impulse response vector. In this case, the base station may rearrange the converted first sparse vector in order of channel impulse response taps. Subsequently, the base station may determine the fifth reception signal model by applying the rearranged first sparse vector to the fourth reception signal model. The fifth reception signal model includes a second sparse vector including K×L×Nt number of non-zero elements. Herein, Nt indicates the number of reference signals in a time-axis direction in one sub frame.

In step 1807, the base station performs compressive sensing with respect to the second sparse vector. That is, the base station may classify elements of the second sparse vector by Nt, and may restore K×L number of elements. For example, the base station may perform compressive sensing to restore K×L number of elements. In this case, the base station may use a multipath matching pursuit (MMP) as a compressive sensing algorithm. According to various embodiments of the present disclosure, the base station may use other compressive sensing algorithms.

In step 1809, the base station may group the restored elements. More specifically, the base station may generate a set in which K×L number of restored elements are arranged in order of restoration. Subsequently, the base station may group the elements of the above-described set. By doing so, the base station may identify what numberth channel impulse response tap of which terminal the elements correspond to.

In step 1811, the base station may perform active user detection and channel estimation. More specifically, the base station may determine an active terminal regarding the set of the elements passing through the grouping. In this case, the base station may determine the active terminal according to an active terminal decision rule having two criteria. For example, according to the first criterion, the base station may select a terminal from which the greatest number of elements are detected as an active terminal. According to the second criterion, the base station may select a terminal having the first restored element as an active terminal. In this case, the first criterion has a priority over the second criterion. The base station may estimate channels of the active terminals by converting channel impulse response taps of the determined active terminals into frequency responses through FFT. Through the above-described process, the base station may perform active user detection and channel estimation simultaneously, and thus can reduce complexity of calculation.

As in the above-described embodiments, the terminal may determine a codebook for reference signals based on a codebook for data, and may transmit reference signals and data symbols to the base station. The base station determines the third reception signal model, the fourth reception signal model, and the fifth reception signal model by using the received reference signals. The base station may restore the elements of the active terminal by performing compressive sensing with respect to the second sparse vector included in the fifth reception signal model. Subsequently, the base station may group the restored elements. Subsequently, the base station may determine an active terminal by applying the active terminal decision rule to the elements passing through the grouping, and may perform channel estimation by performing FFT with respect to the channel impulse response taps of the determined active terminal.

Hereinafter, the above-described procedure for uplink transmission, and active user detection and channel estimation will be described in more detail with reference to the drawings and equations. In the following description, an active terminal is detected according to a compressive sensing technique by way of an example.

The second embodiment of the present disclosure may include a transmitter and a receiver. At the transmitter, each terminal may spread data symbols and reference signals to corresponding low density sparse (LDS) codes, and may transmit the data symbols and the reference signals. Active terminals at the same time may transmit the data symbols and the reference signals by using the same resource in an OFDM trellis for NOMA.

Figure 19:
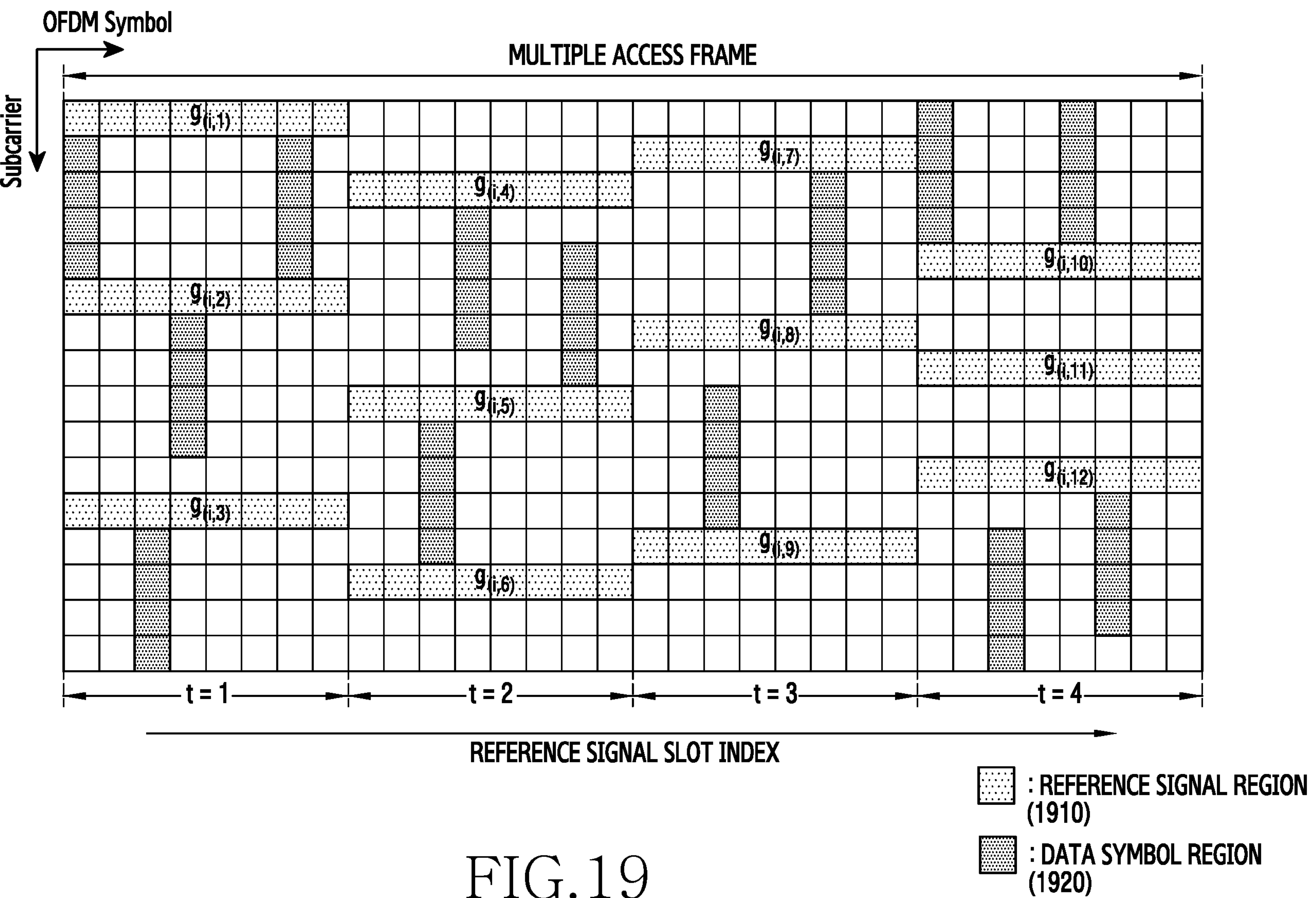
FIG. 19 is a view illustrating an example of allocating resources to a reference signal and a data symbol in a wireless communication system according to various embodiments of the present disclosure.

FIG. 19 is a view illustrating an example of allocating resources to reference signals and data symbols in a wireless communication system according to various embodiments of the present disclosure.

Referring to FIG. 19, the terminal may spread reference signals and data symbols along a time axis and a frequency axis, respectively, and may transmit the same. Herein, the terminal may freely arrange data symbol regions 1920 and reference signal regions 1910 with reference to spread axes. For example, with reference to the OFDM trellis, Nt is the number of reference signal slots on the time axis and Nf is the number of reference signal regions per one slot. The terminal distinguishes regions from one another by assigning indexes 1-R (=Nt,Nf) to regions which are allocated reference signals used for active user detection and channel estimation.

The base station receives overlapping signals transmitted by the respective active terminals. The received data symbols may be expressed by Equation 11 presented below:

$$z = \sum_{i=1}^{N} \mathrm{diag}\left(g_i^{(d)}\right) c_{f(i)} x_i + v' \quad \text{Equation 11}$$

In Equation 11, z is a received data overlapping signal vector, $g_i^{(d)}$ is a channel of an i-th device, $c_{f(i)}$ is an LDS code for data transmission of the i-th device mapped through a function f, xi is a transmission data symbol, and v' is a gaussian noise vector at a receiver.

A reference signal received in an r-th region may be expressed by Equation 12 presented below:

$$\begin{aligned} y_r &= \sum_{i=1}^{N} d_{r,i} g_{(i,r)} p_i + v_r \\ &= D_r G_r p + v_r \\ &= D_r q_r + v_r \end{aligned} \quad \text{Equation 12}$$

In Equation 12, yr is a reference signal received in the r-th reference signal region, dr,i is a code for reference signal transmission in the r-th region of the i-th terminal, g(i,r) is a channel gain value in the r-th region of the i-th terminal, pi is a reference signal symbol of the i-th terminal, Dr is a codebook for reference signal transmission in the r-th region, Gr is a channel matrix of the r-th region, p is a reference signal vector, vr is a gaussian noise vector at a receiver, and qr is a vector in the form of a product of a channel value of the r-th region and a reference signal symbol.

When signals received at all reference signal regions are stacked in order of indexes and are expressed by $y=[y_1^T \ldots y_R^T]^T$, y may be expressed by Equation 13 presented below:

$$y = \mathrm{diag}(D_1, \cdots, D_R) \begin{bmatrix} q_1 \\ \vdots \\ q_R \end{bmatrix} + \begin{bmatrix} v_1 \\ \vdots \\ v_R \end{bmatrix} \quad \text{Equation 13}$$

In Equation 13, y is a reception signal vector in all reference signal regions, Dr is a codebook for reference signal transmission in the r-th region, qr is a vector in the form of a product of a channel value in the r-th region and a reference signal symbol, and vr is a gaussian noise vector at a receiver.

In Equation 13, on the assumption that a vector indicating only elements of the i-th device from the vector $[q_1^T \ldots q_R^T]^T$ is expressed by $w_i=[q_{1,i} \ldots q_{R,T}]^T$ rearrangement of the vector in order of indexes of terminals may be expressed by Equation 14 presented below:

$$y = [\Lambda_1 \ \cdots \ \Lambda_N] \begin{bmatrix} w_1 \\ \vdots \\ w_N \end{bmatrix} + \overline{v} \qquad \text{Equation 14}$$

In Equation 14, y is a reception signal vector in all reference signal regions, $\Lambda_n$ is a codebook that is rearranged in order of indexes of terminals to correspond to wn, that is, a sensing matrix regarding the n-th terminal, wi is a product of a channel value of the i-th terminal and a reference signal symbol, and $\overline{v}$ is a Gaussian noise at a receiver.

In a system model rearranged as indicated by Equation 14, the vector $[w_1^T \ldots w_N^T]^T$ has sparsity regarding active and inactive terminals. For example, when there are K number of active terminals, the rearranged vector is a sparse vector which is formed of K×R number of non-zero elements.

The base station may convert a channel frequency response of a frequency domain into a channel impulse response of a time domain by performing IFFT. By doing so, the base station may estimate a channel of an active terminal. More specifically, when $h_i^{(t)}=[h_{i,1}^{(t)T} \ldots h_{i,CIR}^{(t)T}]^T$ is defined as a channel impulse response of the i-th device in a time domain of a t-th time slot, and the number of reference signals in a frequency axis direction in one sub frame is Nf, a vector in which signals of Nf number of reference signal regions in the t-th time slot are stacked may be expressed by Equation 15 presented below:

$$\begin{aligned} w_i^{(t)} &= \text{diag}(p_i^{(t)})\Phi^{(t)} F_{N_{FFT}} \begin{bmatrix} h_i^{(t)} \\ 0_{N_{FFT}-N_{CIR}} \end{bmatrix} \\ &= \underbrace{\text{diag}(p_i^{(t)})\Phi^{(t)} F_{N_{FFT}} \Pi}_{U_i^{(t)}} h_i^{(t)} \end{aligned} \qquad \text{Equation 15}$$

In Equation 15, $w_i^{(t)}$ is an estimation value regarding a signal of the i-th terminal in the t-th time slot, $p_i^{(t)} \in \square^{N_f \times 1}$ is a reference signal symbol vector at the i-th slot of the i-th device, $F_{N_{FFT}} \in \square^{N_{FFT} \times N_{FFT}}$ is a fast Fourier transform matrix, $\Phi^{(t)} \in \square^{N_f \times N_{FFT}}$ is a coordinate matrix indicating positions of reference signal regions at the t-th slot, and Π is a coordinate matrix indicating positions of channel impulse responses in the entire FFT size.

Based on Equation 15, $w_i=[w_1^{(1)^T} \ldots w_i^{(N_f)^T}]^T$ of the i-th device may be expressed by Equation 16 presented below:

$$w_i = \text{diag}\left(\left[U_i^{(1)} \ \cdots \ U_i^{(N_f)}\right]\right) \begin{bmatrix} h_i^{(1)} \\ \vdots \\ h_i^{(N_f)} \end{bmatrix} \qquad \text{Equation 16}$$

In Equation 16, wi is an estimation value vector regarding a signal of the i-th terminal, $U_i^{(t)}$ is other matrix excluding a channel impulse response, and $h_i^{(t)}$ is a channel impulse response of the i-th device at the t-th time slot.

When the total number of taps of a time domain channel impulse response is NCIR, and a vector indicating a set of the j-th elements of $h_i^{(t)^T}$ from the vector $[h_i^{(1)^T} \ldots h_i^{(N_f)^T}]^T$, that is, j-th taps of the channel impulse response vector, is defined by $m_{i,j}=[h_{j,i}^{(1)} \ldots h_{j,i}^{(N_f)}]^T$, j=1, . . . , $N_{CIR}$, rearrangement of the vector in order of channel impulse response taps may be expressed by Equation 17 presented below:

$$\begin{aligned} w_i &= \left[\sum\nolimits_{1,i} \ \cdots \ \sum\nolimits_{N_{CIR},i}\right] \begin{bmatrix} m_{1,i} \\ \vdots \\ m_{N_{CIR},i} \end{bmatrix} \\ &= \sum\nolimits_i \begin{bmatrix} m_{1,i} \\ \vdots \\ m_{N_{CIR},i} \end{bmatrix} \end{aligned} \qquad \text{Equation 17}$$

In Equation 17, wi is an estimation value vector regarding a signal of the i-th terminal, and mi,j is a j-th channel impulse response tap of the i-th terminal.

One of the features of a multipath propagation environment in a radio channel is that a small number of elements occupy most of energy of a channel impulse response vector. Accordingly, the base station may assume that the channel impulse response vector is a sparse vector having some strong multipaths, that is, non-zero elements. In addition, if it is assumed that the multipath propagation environment is not greatly changed in one transmission frame, the channel impulse response vector of each time slot in the frame may have non-zero elements at the same position. When there are L number of multipaths, $[m_{1,i}^T \ldots m_{N_{CIR},i}^T]^T$ in Equation 17 is a sparse vector having Nt×L number of non-zero elements. In this case, Nt is the number of reference signals in the time axis direction in one sub-frame. When wi in Equation 17 is applied to Equation 14, Equation 14 may be expressed by Equation 18 presented below:

$$\begin{aligned} y &= [\Lambda_1 \ \cdots \ \Lambda_N] \begin{bmatrix} w_1 \\ \vdots \\ w_N \end{bmatrix} + \overline{v} \\ &= [\Lambda_1 \ \cdots \ \Lambda_N] \begin{bmatrix} \sum_1 \begin{bmatrix} m_{1,1} \\ \vdots \\ m_{N_{CiR},1} \end{bmatrix} \\ \vdots \\ \sum_N \begin{bmatrix} m_{1,N} \\ \vdots \\ m_{N_{CiR},N} \end{bmatrix} \end{bmatrix} + \overline{v} \\ &= [\Lambda_1\Sigma_1 \ \cdots \ \Lambda_N\Sigma_N] \begin{bmatrix} \begin{bmatrix} m_{1,1} \\ \vdots \\ m_{N_{CiR},1} \end{bmatrix} \\ \vdots \\ \begin{bmatrix} m_{1,N} \\ \vdots \\ m_{N_{CiR},N} \end{bmatrix} \end{bmatrix} + \overline{v} \\ &= \Theta \begin{bmatrix} m_1 \\ \vdots \\ m_N \end{bmatrix} + \overline{v} \end{aligned} \qquad \text{Equation 18}$$

In Equation 18, wi is an estimation value vector regarding a signal of the i-th terminal, mi,j is a j-th channel impulse response tap of the i-th terminal, $\Lambda_n$ is a codebook that is rearranged in order of indexes of terminals to correspond to wn, $\overline{v}$ is a gaussian noise at a receiver, and the vector $[m_1^T \ldots m_N^T]^T$ is a sparse vector having K×L×Nt number of non-zero elements.

The base station may restore a sparse vector by using a compressive sensing technique using sparsity. Since there are K×L number of Nt number of non-zero elements, the base station may restore the sparse vector by grouping Nt number of elements as one element. In this case, the base station may apply a compressive sensing technique of restoring K×L number of elements.

FIG. 20 is a view illustrating an example of a sparse vector configuration in a wireless communication system according to various embodiments of the present disclosure.

Referring to FIG. 20, an example of a sparse vector $[m_1^T \ldots m_N^T]^T$ is illustrated. More specifically, elements 2010 indicating K number of active terminals in a sparse vector are illustrated. For example, when K is 3, three elements m2, m36, m84 indicate three active terminals. In addition, elements 2020 indicating L number of multipaths regarding each active terminal are illustrated. When L is 2, $m_{15}^{(2)}$ and $m_{27}^{(2)}$ indicate two multipaths regarding m2. K×L number of elements calculated through the compressive sensing technique have two pieces of information indicating an index of an active terminal, and a position and a size of a tap in a channel impulse response vector of the corresponding index. In this case, the base station may determine an active terminal according to a rule of determining an active terminal through these elements. In addition, the base station may estimate a frequency response, that is, a channel, by performing FFT with respect to the channel impulse response tap of the determined active terminal. Accordingly, the second embodiment of the present disclosure differs from the related-art grant-free-based system in that active user detection and channel estimation are performed simultaneously through a single compressive sensing technique.

In the method in which the base station determines an active terminal based on K×L number of elements, the method for grouping the elements may be expressed by Equation 19 presented below:

$$(i-1)\times N_{CIR}<n\leq(i)\times N_{CIR}:i=1,2, \ldots ,N,n=1,2, \ldots ,N\times N_{CIR}$$

$$j=n-(i-1)\times N_{CIR}:i\text{from}(1),j=1,2, \ldots ,N_{CIR} \qquad \text{Equation 19}$$

In Equation 19, i is a group index of elements, j is a position of an element in the i-th group, NCIR is the number of channel impulse response taps. Through the grouping method, the base station may indicate an element mn of the sparse vector as $m_j^{(i)}$.

When it is assumed that a set $R'=\{\ldots,\hat{m}_n,\ldots\}$, $n=1,\ldots,N,n=1,\ldots,N\times N_{CIR}$ is a set in which K×L number of elements are arranged in order of restoration, n is a position index of a restored element. The base station may identify what numberth channel impulse response tap of which terminal an element corresponds to, by grouping the elements of the set R according to Equation 19. The base station may determine K number of right active terminals with respect to the set $R'=\{\ldots,\hat{m}_j^i,\ldots\},i=1,\ldots,N,j=1,\ldots,N\times N_{CIR}$ passing through the grouping. In this case, the active terminal decision rule performed at the base station is as follows:

The base station may consider two criteria as the active terminal decision rule. According to the first criterion, the base station may determine a terminal from which the greatest number of elements are obtained as an active terminal. According to the second criterion, the base station may determine a terminal having the element restored first as an active terminal. The first criterion may have a priority over the second criterion. A set $T=\{\{\ldots\},\ldots,\{\ldots,\hat{m}_j^i,\ldots\},\ldots,\{\ldots\}\}$ passing through the decision rule may have K number of subsets, and each subset may have L or less number of elements. The base station may convert taps of the active terminals determined through the decision rule into frequency response by performing FFT. Since a channel is estimated by doing so, the base station may detect data that has been transmitted by the active terminal. For example, the base station may detect data that has been transmitted by the active terminal through a data detector. In this case, the data detector may use a message passing algorithm exchanging a probability value between a terminal node and a resource node. A specific algorithm for active user detection and time domain channel estimation in the second embodiment of the present disclosure is illustrated in table 1 presented below:

TABLE 1

| Algorithm 1: Joint active user detection & time domain channel estimation |
|---|
| INPUT<br>: $y\in\mathbb{C}^{N_p R\times 1}$(received pilot vector), Θ∈ z,43 $^{N_p R\times N_{CIR} N_1 N}$ (sensing matrix ), K(number of active user), L(number of dominant channel tap)<br>Step 1 Joint Active User and CIR detection<br>Do the Compressive Sensing Algorithm<br>Step 2 Grouping<br>Re-index the output of CS Algorithm<br>Step 3 Active User Decision<br>Decision Rule<br>OUTPUT : $x_{\{r\}}\in$ z,43 $^{N_{CIR} N\times 1}$($\|x_{\{r\}}\|_0 \leq KL$), $t \in \{1 \ldots N_1\}$ |

Referring to table 1, a received reference signal vector y, a sensing matrix 8, the number of active terminals K, and the number of dominant channel taps L are provided as input parameters.

At the first step, the base station detects a joint active terminal and a channel impulse response. In this case, the base station may use a compressive sensing algorithm. By doing so, the base station may restore a sparse vector $[m_1^T \ldots m_N^T]^T$.

At the second step, the base station performs grouping. That is, the base station may identify which element is what numberth channel impulse response tab of which terminal, by re-indexing the elements restored through the compressive sensing algorithm.

At the third step, the base station determines an active terminal. In this case, the base station may determine an active terminal by using an active terminal decision rule. By doing so, the base station may obtain an output x(t) and may convert taps of the determined active terminal into frequency responses by performing FFT, that is, may estimate a channel.

Figure 21:
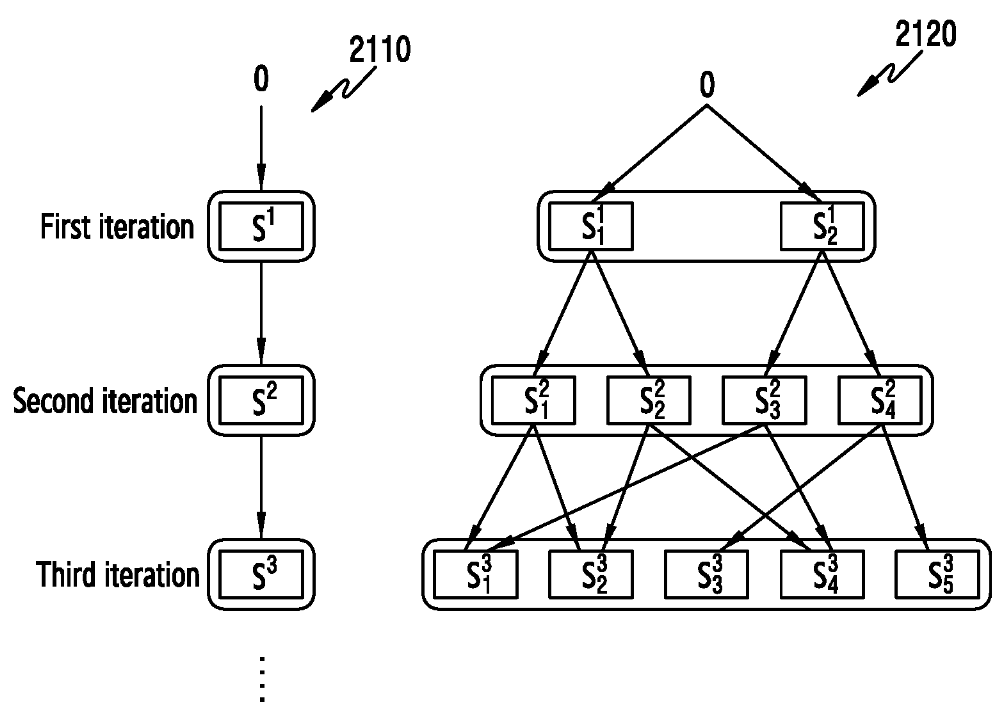
FIG. 21 is a view illustrating an operation example of an orthogonal matching pursuit (OMP) method and a multiple matching pursuit (MMP) method in a wireless communication system according to various embodiments of the present disclosure.

FIG. 21 is a view illustrating an example of operation of an OMP method and an MMP method in a wireless communication system according to various embodiments of the present disclosure.

Referring to FIG. 21, in the second embodiment, the base station may use the MMP method 2120 instead of the OMP method 2110 as a compressive sensing method to detect an active terminal.

More specifically, the OMP method 2110 of the compressive sensing technique is the simplest method for restoring data, and a greedy method. That is, the OMP method is a method of selecting an index best correlated with modified measurements as a new element, while performing an iterative algorithm through a single path. Therefore, when an inexact index is selected while performing the iterative algorithm, there is a problem that a resulting value of the OMP method is incorrect. To solve this problem of the OMP method, the base station may use the MMP method. The MMP method 2120 may use an iterative algorithm through a multipath, that is, may use a tree-based algorithm. The MMP method selects an index having highest correlation as a new element, while performing the iterative algorithm through the multipath. Accordingly, the MMP method increases the number of elements as the iterative algorithm is further performed, and at the final step, may restore an index indicating a minimum residual from among these elements.

Therefore, even when the MMP method selects an inexact index while performing the iterative algorithm, the index does not have a great effect on a final restoration value. In addition, since the MMP method overlaps elements in each iteration step, an overhead in calculation is not great in comparison with the OMP method. Accordingly, in the second embodiment of the present disclosure, the base station uses the MMP method in the active user detection process, and thus can derive more exact detection performance than in the OMP method.

Figure 22:
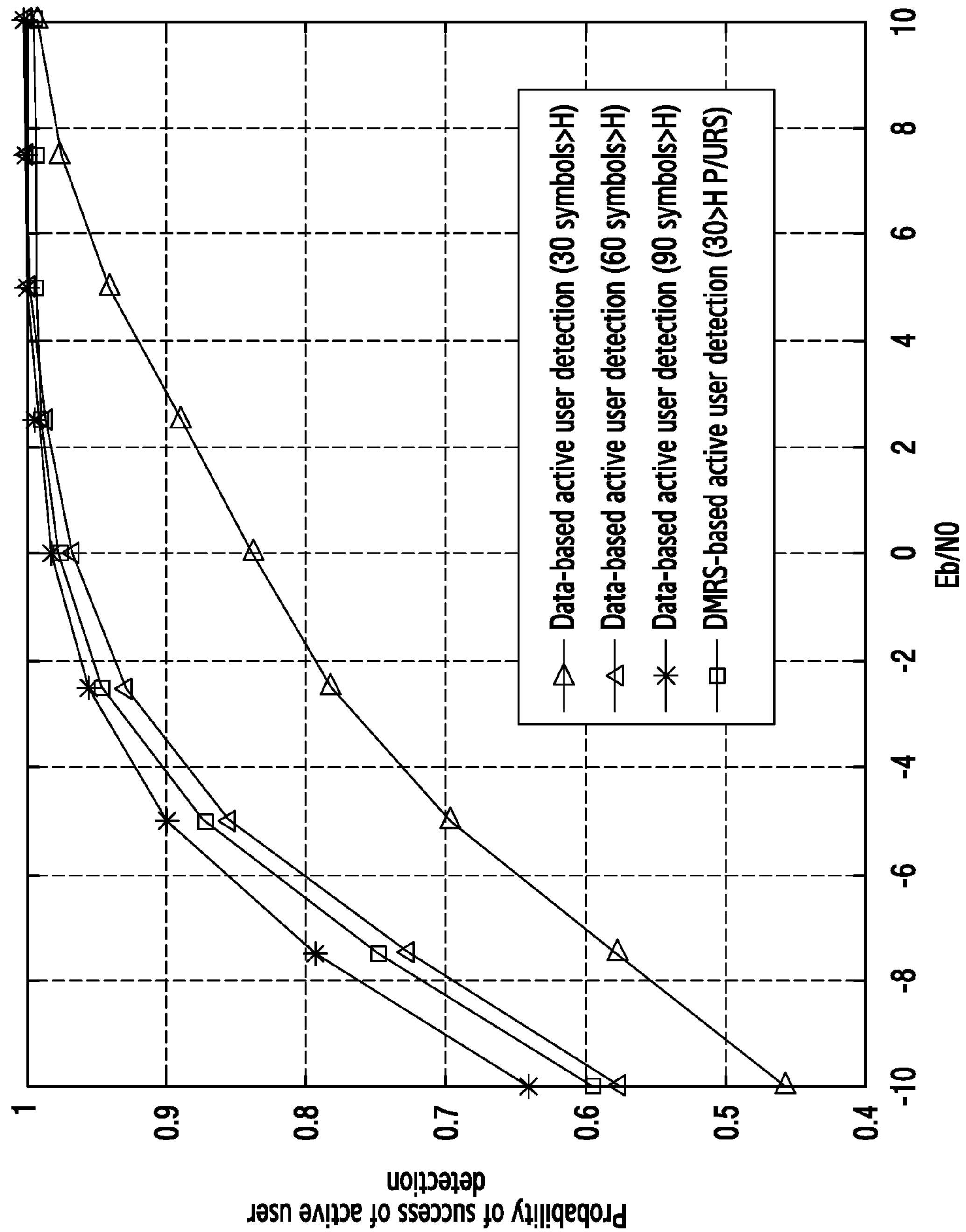
FIG. 22 is a view illustrating results of simulating regarding active user detection performance according to the number of data symbols, and active user detection performance based on a reference signal in a wireless communication system according to various embodiments of the present disclosure.

FIG. 22 is a view illustrating results of simulating active user detection performance according to the number of data symbols, and active user detection performance based on reference signals in a wireless communication system according to various embodiments of the present disclosure.

Referring to FIG. 22, graphs show results of simulating according to different numbers of data symbols, and indicate that, as the number of data symbols increases, a probability of active user detection increases.

Figure 23:
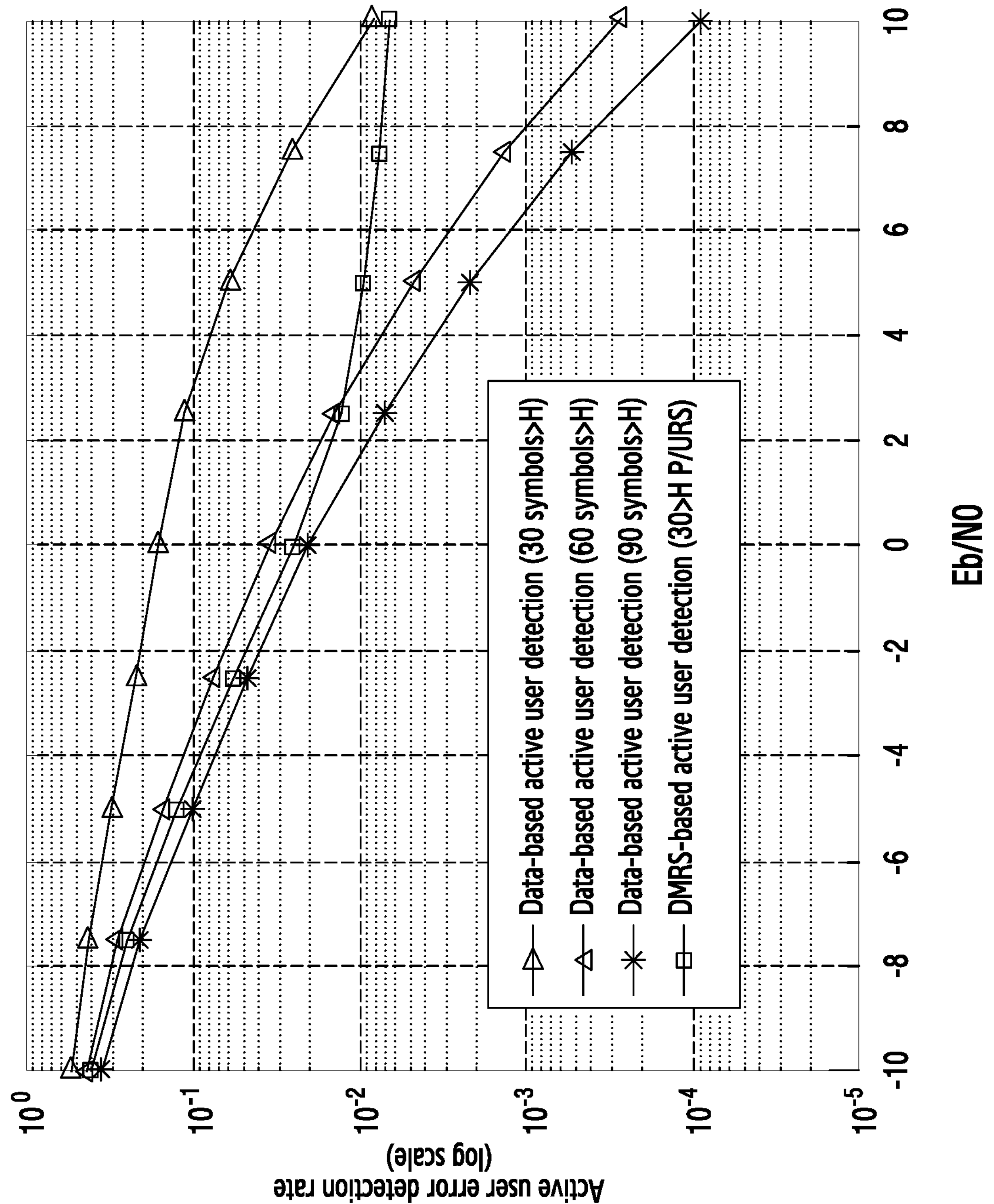
FIG. 23 is a view illustrating results of simulating regarding an active user error detection rate according to the number of data symbols, and an active user error detection rate based on a reference signal in a wireless communication system according to various embodiments.

FIG. 23 is a view illustrating results of simulating regarding an active user error detection rate according to the number of data symbols, and an active user error detection rate based on reference signals in a wireless communication system according to various embodiments of the present disclosure.

Referring to FIG. 23, graphs show results of simulating according to different numbers of data symbols, and indicate that, as the number of data symbols increases, an active user error detection rate is reduced. In addition, when active user detection is performed based on DMRS, an error floor phenomenon appears, but, when active user detection is performed based on data, the detection does not depend on channel information and thus the error floor phenomenon does not appear.

Figure 24:
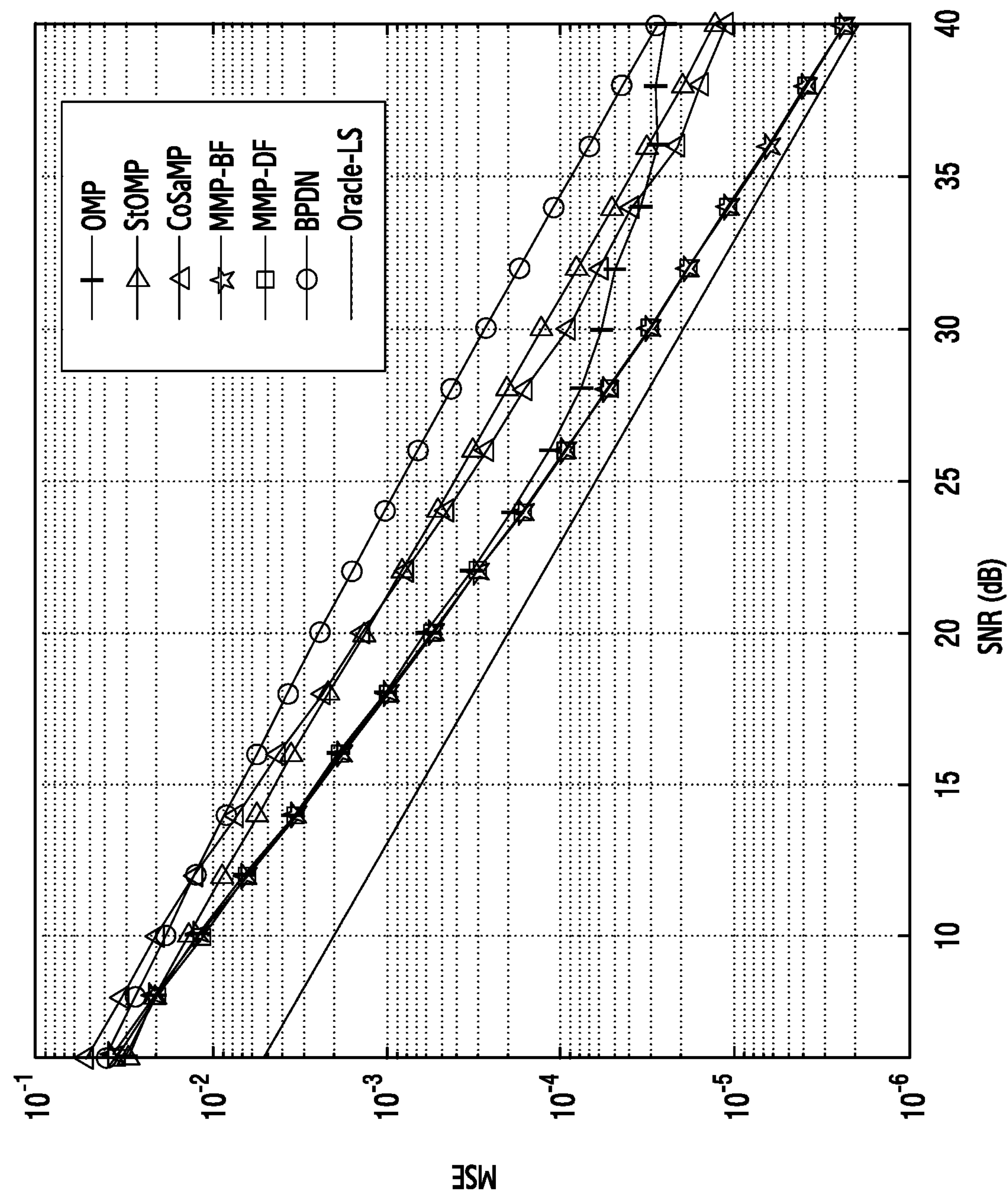
FIG. 24 is a view illustrating results of simulating by using an MMIP method in a wireless communication system according to various embodiments of the present disclosure.

FIG. 24 is a view illustrating results of simulating by using the MMP method in a wireless communication system according to various embodiments of the present disclosure.

Referring to FIG. 24, graphs show performance of various compressive sensing techniques. That is, since the MMP method shows that a mean square error (MSE) has the smallest distribution compared with a signal to noise ratio (SNR), the MMP method may have higher performance in comparison with other compressive sensing techniques such as the OMP method.

Methods based on the claims or the embodiments disclosed in specification of the present disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in specification of the present disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the present disclosure. In addition, an additional storage device on a communication network may access to a device which performs the embodiments of the present disclosure.

In the above-described specific embodiments of the present disclosure, elements included in the present disclosure are expressed in singular or plural forms according to specific embodiments. However, singular or plural forms are appropriately selected according to suggested situations for convenience of explanation, and the present disclosure is not limited to a single element or plural elements. An element which is expressed in a plural form may be configured in a singular form or an element which is expressed in a singular form may be configured in plural number.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

Although the present disclosure has been described with various embodiments, various changes and modifications may be suggested to one skilled in the art. It is intended that the present disclosure encompass such changes and modifications as fall within the scope of the appended claims.

What is claimed is:

1. A terminal in a wireless communication system, the terminal comprising:

at least one processor configured to:

map codes, wherein each of the codes are included in different codebooks onto a plurality of consecutive data symbols within an orthogonal frequency division multiplexing (OFDM) data symbol region, and spread reference signals by using different codebooks; and a transceiver configured to:

transmit the plurality of consecutive data symbols spread by using the different codebooks to a base station, and transmit the reference signals to the base station through a first OFDM symbol among the plurality of consecutive data symbols in the OFDM data symbol region, wherein the plurality of consecutive data symbols is used for a base station to detect at least one active terminal including the terminal, and wherein the plurality of consecutive data symbols and the reference signals overlap with other consecutive data symbols and other reference signals which are transmitted by another terminal in a same resource region.

2. The terminal of claim 1, wherein the different codebooks are generated by circularly shifting a base codebook,
   wherein the at least one active terminal includes at least one terminal transmitting consecutive data symbols among terminals connected to the base station.

3. The terminal of claim 1, wherein the at least one processor is further configured to:
   allocate indexes to the plurality of consecutive data symbols regardless of a resource region, and
   determine the different codebooks corresponding to the plurality of consecutive data symbols, based on the indexes, and
   allocate codes included in the determined codebooks to the plurality of consecutive data symbols.

4. The terminal of claim 1, wherein the at least one processor is further configured to:
   map codes onto resource regions,
   allocate the plurality of consecutive data symbols to the resource regions, and
   allocate the codes mapped onto the resource regions to each of the plurality of consecutive data symbols.

5. A base station in a wireless communication system, the base station comprising:
   a transceiver configured to receive a plurality of consecutive data symbols; and
   at least one processor configured to:
      determine a first reception signal model regarding all data transmission regions,
      determine a second reception signal model based on the determined first reception signal model,
      detect indexes of active terminals by using the second reception signal model,
      detect active terminals based on the plurality of consecutive data symbols, and
      estimate channels of the active terminals by using the plurality of consecutive data symbols,
   wherein the second reception signal model is a matrix that is obtained by rearranging the first reception signal model in order of terminals, and
   wherein codes included in different codebooks are mapped onto the plurality of consecutive data symbols within an orthogonal frequency division multiplexing (OFDM) data symbol region.

6. The base station of claim 5, wherein the transceiver is further configured to receive reference signals transmitted through a first OFDM symbol among the plurality of consecutive data symbols in the OFDM data symbol region,
   wherein the at least one processor is further configured to:
      estimate channels of the first OFDM symbols of the active terminals by using the reference signals, and
      estimate channels of the active terminals by using channels of the first OFDM symbols and the plurality of consecutive data symbols.

7. The base station of claim 6, wherein the at least one processor is further configured to:
   detect a data symbol transmitted to a last OFDM symbol, based on the channels estimated by using the first OFDM symbol,
   estimate a doppler frequency by using the detected data symbol as a virtual reference signal, and
   estimate channels of the active terminals by using the doppler frequency.

8. The base station of claim 6, wherein the at least one processor is further configured to:
   measure channel magnitude of the active terminals,
   when the channel magnitude is greater than or equal to a threshold, detect consecutive data symbols of the active terminals, and
   estimate channels of the active terminals by using the detected consecutive data symbols as virtual reference signals.

9. The base station of claim 5, wherein the transceiver is further configured to receive consecutive data symbols and reference signals from a plurality of terminals, and
   the at least one processor is further configured to:
      determine information regarding reception signals indicating components included in respective channel impulse responses of the plurality of terminals based on the received reference signals, and
      perform active terminal detection and channel estimation by using the information regarding the reception signals.

10. The base station of claim 9, wherein the at least one processor is further configured to:
   detect active terminals by using the information regarding the reception signals;
   determine a third reception signal model regarding all reference signal regions; and
   determine a fourth reception signal model comprising a first sparse vector based on the third reception signal model, and
   wherein the fourth reception signal model is a matrix that is obtained by rearranging the third reception signal model in order of terminals.

11. The base station of claim 10, wherein the at least one processor is further configured to:
   determine a fifth reception signal model comprising a second sparse vector by rearranging the first sparse vector included in the fourth reception signal model, and
   restore elements of the active terminals by using the second sparse vector included in the fifth reception signal model.

12. The base station of claim 11, wherein the at least one processor is further configured to:
   group the restored elements;
   determine active terminals by using the grouped elements; and
   estimate channels of the active terminals by using the determined active terminals.

13. The base station of claim 12, wherein the at least one processor is further configured to:
   determine the active terminals according to a number of the grouped elements; and
   determine the active terminals in order of restoration of the grouped elements.

14. A method performed by a base station in a wireless communication system, the method comprising:
   receiving a plurality of consecutive data symbols;
   detecting active terminals based on the plurality of consecutive data symbols; and
   estimating channels of the active terminals by using the plurality of consecutive data symbols,
   wherein detecting the active terminals comprises:
      determining a first reception signal model regarding all data transmission regions,
      determining a second reception signal model based on the determined first reception signal model, and
      detecting indexes of the active terminals by using the second reception signal model, wherein the second reception signal model is a matrix that is obtained by rearranging the first reception signal model in order of terminals, and wherein codes included in different codebooks are mapped onto the plurality of consecutive data symbols within an orthogonal frequency division multiplexing (OFDM) data symbol region.

15. The method of claim 14, further comprising:

receiving reference signals transmitted through a first OFDM symbol among the plurality of consecutive data symbols in the OFDM data symbol region;

estimating channels of the first OFDM symbols of the active terminals by using the reference signals; and estimating channels of the active terminals by using channels of the first OFDM symbols and the plurality of consecutive data symbols.

16. The method of claim 15, wherein estimating the channels of the active terminals comprises:

measuring channel magnitudes of the active terminals;

when the channel magnitude is greater than or equal to a threshold, detecting consecutive data symbols of the active terminals; and estimating channels of the active terminals by using the detected consecutive data symbols as virtual reference signals.

17. The method of claim 15, wherein estimating the channels of the active terminals comprises:

detecting a data symbol transmitted to a last OFDM symbol, based on the channels estimated by using the first OFDM symbol;

estimating a doppler frequency by using the detected data symbol as a virtual reference signal; and estimating channels of the active terminals by using the doppler frequency.

* * * * *